US006006014A

United States Patent [19]

Yamaguchi et al.

[11] Patent Number: 6,006,014

[45] **Date of Patent: *Dec. 21, 1999**

[54] TAPE-SHAPED LABEL PRINTING DEVICE HAVING COLOR RANGE SETTING MEANS

[75] Inventors: Koshiro Yamaguchi, Kasugai; Akihiko Niwa, Nagoya, both of Japan

[73] Assignee: Brother Kogyo Kabushiki Kaisha, Nagoya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,503

[22] Filed: Oct. 29, 1997

Related U.S. Application Data

[62] Division of application No. 08/730,937, Oct. 16, 1996, Pat. No. 5,685,656.

[30] Foreign Application Priority Data

| | | | |
|---|---|---|---|
| Oct. 19, 1995 | [JP] | Japan | 7-271363 |
| Oct. 20, 1995 | [JP] | Japan | 7-272636 |

[51] Int. Cl.[6] .......... G06K 15/00

[52] U.S. Cl. .......... 395/117; 395/105

[58] Field of Search .......... 395/101, 112, 395/117, 102, 111, 105; 707/507, 508, 517, 518, 519, 539; 347/172, 174–178; 400/70, 76, 61, 62, 120.02, 120.04

[56] References Cited

U.S. PATENT DOCUMENTS

| | | | |
|---|---|---|---|
| 4,619,537 | 10/1986 | Do et al. . | |
| 4,887,096 | 12/1989 | Asakura et al. . | |
| 5,232,297 | 8/1993 | Kitazawa . | |
| 5,399,031 | 3/1995 | Whritenor | 400/120.4 |
| 5,610,648 | 3/1997 | Sims et al. | 347/174 |

FOREIGN PATENT DOCUMENTS

| | | | |
|---|---|---|---|
| 0 592 198 A2 | 4/1994 | European Pat. Off. . | |
| 0 592 198 A3 | 4/1994 | European Pat. Off. . | |
| 0 625 427 A2 | 11/1994 | European Pat. Off. . | |
| 0 704 311 A2 | 4/1996 | European Pat. Off. . | |
| 57-69065 | 4/1982 | Japan | 395/101 |
| 59-153624 | 7/1984 | Japan . | |
| 5-84994 | 4/1993 | Japan . | |

*Primary Examiner*—Arthur G. Evans
*Attorney, Agent, or Firm*—Oliff & Berridge, PLC

[57] ABSTRACT

A tape-shaped label printing device for use with a plurality of freely detachably mountable ribbon cassettes each housing a different color ink ribbon for printing serially on a tape in a plurality of print colors, the label printing device including: an input unit for inputting characters, symbols, and a variety of commands; a data memory unit for storing input text data; a tape/ink ribbon movement mechanism for feeding in a feeding direction the tape and, in synchronization with the tape, an ink ribbon of a mounted one of the ribbon cassettes; a print unit including a print head for printing on the tape via the ink ribbon; a color range setting unit for setting, to text stored in the data memory unit, a printing target range for each of the print colors: print control unit for controlling drive of the tape/ribbon movement mechanism and the print unit to print, on the tape, each printing target range set by the color range setting unit; and an idle feed control unit for, after each printing target range set by the color range setting unit is printed, controlling drive of the tape/ribbon movement mechanism to feed the tape and the ink ribbon only a predetermined distance in the feed direction.

18 Claims, 31 Drawing Sheets

121

| | |
|---|---|
| A | RED |
| B | RED |
| SP | |
| C | GREEN |
| D | GREEN |
| E | GREEN |
| SP | |
| F | BLACK |
| G | BLACK |
| | |

TAPE-SHAPED LABEL PRINTING DEVICE HAVING COLOR RANGE SETTING MEANS

This is a Division of application Ser. No. 08/730,937 filed Oct. 16, 1996, now U.S. Pat. No. 5,685,656.

BACKGROUND OF THE INVENTION

1. Field of the Invention

The present invention relates to a tape-shaped label producing device for printing characters and symbols on a tape which serves as a printing medium, and more particularly to performing multi-color printing by printing while exchanging a plurality of ribbon cassettes provided with different colored ink ribbons.

2. Description of the Related Art

Japanese Patent Application (Kokai) No. HEI-5-34994 describes a tape cassette housing an ink ribbon wound around a ribbon spool and a print tape, which serves as a print medium, wound around a tape spool. A thermal head is used to print marks and characters such as characters and symbols on the print tape via the ink ribbon. This tape-shaped label printing device is suitable for making labels to adhere to file tabs. It includes a keyboard, a display, and a printing mechanism of the thermal printing type, and is configured to print characters, marks, and the like in a variety of font styles and sizes on a printing tape medium having widths such as 6, 9, 12, 18, and 24 mm.

The tape-shaped label prepared by printing characters is used not only on the spines of files but can also be adhered to cassette tapes, video tapes, or to their cases. Furthermore, it is conceivable to print character trains by partially changing print color according to recorded content of the corresponding tape or to the category of the tape to obtain a more colorful appearance.

SUMMARY OF THE INVENTION

It is conceivable to create a plurality of ribbon cassettes, separate from the tape cassette, housing not only black ink ribbons, but ink ribbons in a plurality of colors such as red, green, and blue. Each of the ribbon cassettes is detachably mountable in the tape cassette. The order in which the print colors are printed for multiple color printing is set in accordance with an order in which printing is to be performed. Also, a color range setting process is performed on the input text data so as to make correspondence between desired print colors and the selected character arrays of the input text data. The ribbon cassettes having the same ribbon color as the set printing colors are exchanged in sequence during the printing process. In this way, a tape-shaped label can be printed with input text in multiple colors.

In a conceivable printing method for the above-described conceivable tape producing device, after the tape is fed a length required for regularly input text, feed of the tape is stopped so the ribbon cassette can be exchanged. Then, the tape is rewound and printing performed in a subsequent color. In this conceivable method of printing, each ink ribbon would also be transported by the same length as the length of input text.

However, because print colors are set to corresponding character units or predetermined ranges, only the ink ribbon corresponding to the printed color set for the last character of the input text needs to be fed a distance equalling the entire input text. Other ink ribbons are transported more than is necessary, which results in a problem that ink ribbon is wastefully consumed.

It is an objective of the present invention to overcome the above-described problems and to provide a tape-shaped label printing device wherein ink ribbon is not wastefully consumed during multi-color printing.

To achieve these objectives, a tape-shaped label printing device according to the present invention includes input means for inputting characters, symbols, and a variety of commands; data memory means for storing input text data; a tape/ink ribbon movement mechanism for feeding in a feeding direction the tape and, in synchronization with the tape, an ink ribbon of a mounted one of the ribbon cassettes; print means including a print head for printing on the tape via the ink ribbon; color range setting means for setting, to text stored in the data memory means, a printing target range for each of the print colors: print control means for controlling drive of the tape/ribbon movement mechanism and the print means to print, on the tape, each printing target range set by the color range setting means; and idle feed control means for, after each printing target range set by the color range setting means is printed, controlling drive of the tape/ribbon movement mechanism to feed the tape and the ink ribbon only a predetermined distance in the feed direction.

In a tape-shaped label printing device with this configuration, the print control means performs printing on a tape by controlling the drive of the tape movement mechanism, the ribbon movement mechanism, and the print means for each range set by the color range setting means. After printing for each set range is completed, the idle feed control means feed the tape and the ink ribbon only for a predetermined distance in the feed direction.

According to another aspect of the present invention, a tape-shaped label printing device includes input means for inputting characters, symbols, and a variety of commands; data memory means for storing input text data; a tape/ink ribbon movement mechanism for feeding the tape and the ink ribbon of a mounted one of the ribbon cassettes in synchronization in a feeding direction along a tape/ribbon transport pathway; print means including a print head for printing on the tape via the ink ribbon; color range setting means for setting, to text stored in the data memory means, a printing target range for each of the print colors: print control means for controlling drive of the tape/ribbon movement mechanism and the print means to print, on the tape, each printing target range set by the color range setting means; and stop control means for stopping feed of the tape and the ink ribbon after printing each printing target range set by the color range setting means.

According to another aspect of the present invention, after printing of each set range is completed, the ink ribbon and tape are transported to a separation member so that the ink ribbon and the tape can be reliably separated.

BRIEF DESCRIPTION OF THE DRAWINGS

The above and other objects, features and advantages of the invention will become more apparent from reading the following description of the preferred embodiment taken in connection with the accompanying drawings in which:

FIG. 28(*b*) is an explanatory diagram showing a point at which the tape has been supplied by the length of the front margin;

FIG. 28(*c*) is an explanatory diagram showing the point at which the tape has been further supplied by a distance of idle feeding;

FIG. 35(*b*) is an explanatory diagram showing a point at which the tape has been supplied by the length of the front margin and the mark printed according to the second embodiment;

FIG. 35(*c*) is an explanatory diagram showing the point at which the tape has been further supplied by a distance of idle feeding and the mark printed according to the second embodiment.

DETAILED DESCRIPTION OF THE PREFERRED EMBODIMENTS

Figure 1:
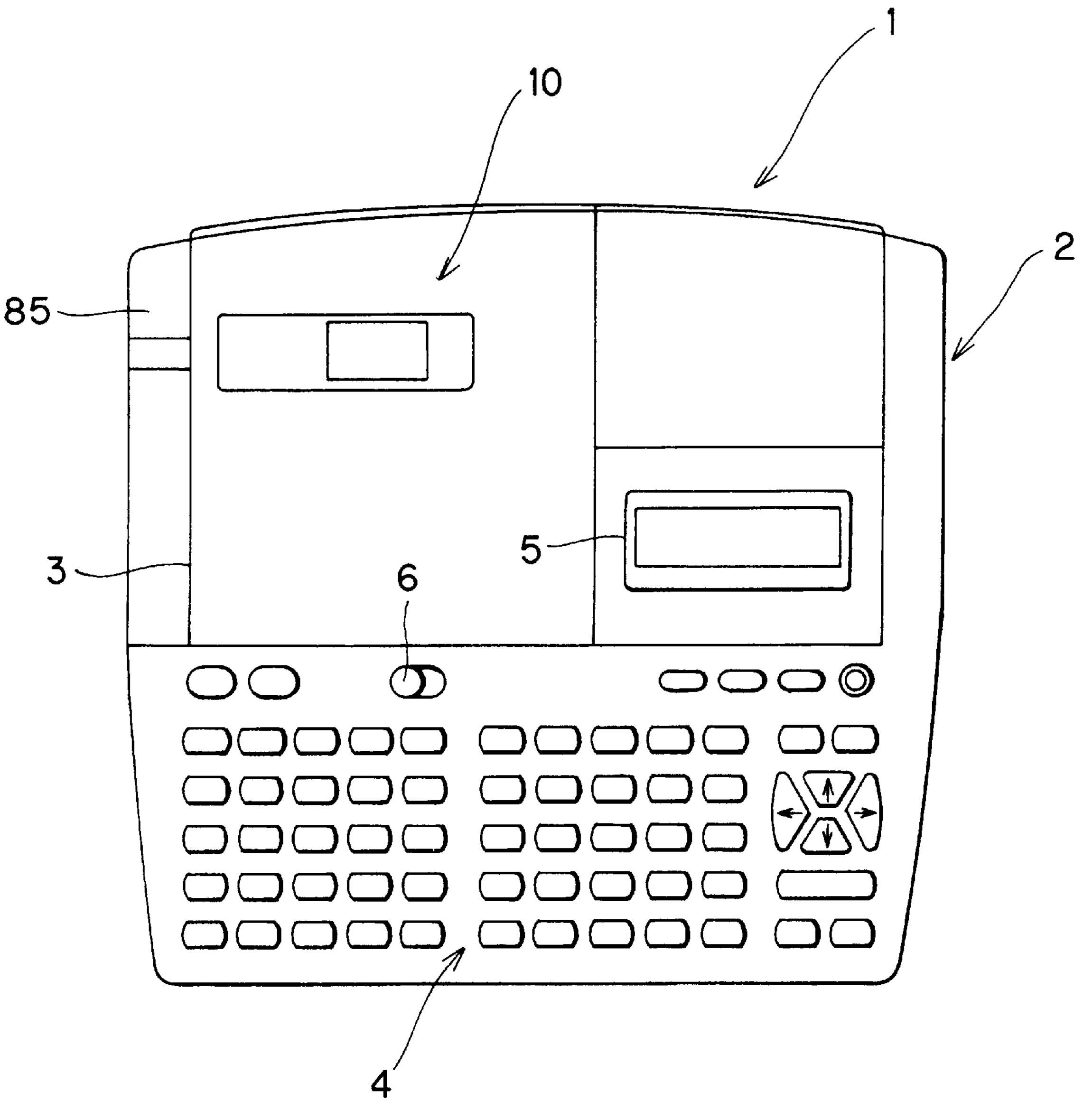
FIG. 1 is a plan view showing a tape-shaped label printing device according to an embodiment of the present invention.

A tape-shaped label printing device according to a preferred embodiment of the present invention will be described while referring to the accompanying drawings wherein like parts and components are designated by the same reference numerals to avoid duplicating description.

The present embodiment is applied to a tape-shaped label printing device capable of printing characters, symbols, and the like in a plurality of colors on a printing tape, which is a printing medium, by exchanging a plurality of ribbon cassettes, each with a different ribbon color.

As shown in FIG. 1, a keyboard 4 is arranged on the front portion of the main cover 2 of a tape-shaped label printing device 1. The keyboard 4 is provided with various function keys and includes keys such as character keys, symbol keys, and numeric keys. Immediately behind the keyboard 4, a liquid crystal display 5 capable of displaying the input characters, symbols, and the like is provided. A thermal printing mechanism 10 containing a thermal head 12 is provided within the main cover 2. The thermal head 12 is provided at a position corresponding to a cassette cover 3, which is opened and closed to allow exchanging of ribbon cassettes 30. A slide knob 6 is provided slidably for opening the cassette cover 3. A cutting knob 85 is also provided, which is pressed down for manually cutting a printing tape 22 which has been printed on.

Next, the thermal printing mechanism 10 including the thermal head 12 will be described with reference to FIGS. 2 through 8.

First, a tape cassette 20 detachably mounted on the thermal printing mechanism 10 will be described with reference to FIGS. 2 through 5 and FIG. 7.

A tape spool 23 is rotatably provided on the inside of a tape case 21 of the tape cassette 20. Around the tape spool 23 is wound a printing tape 22 formed of a thin film. The printing tape 22 supplied from the tape spool 23 is moved in the tape feeding direction by a tape feeding roller 24 while being guided in a curved passage by a plurality of guides, passing directly in front of the thermal head 12, and discharged out of the tape cassette 20.

Figure 7:
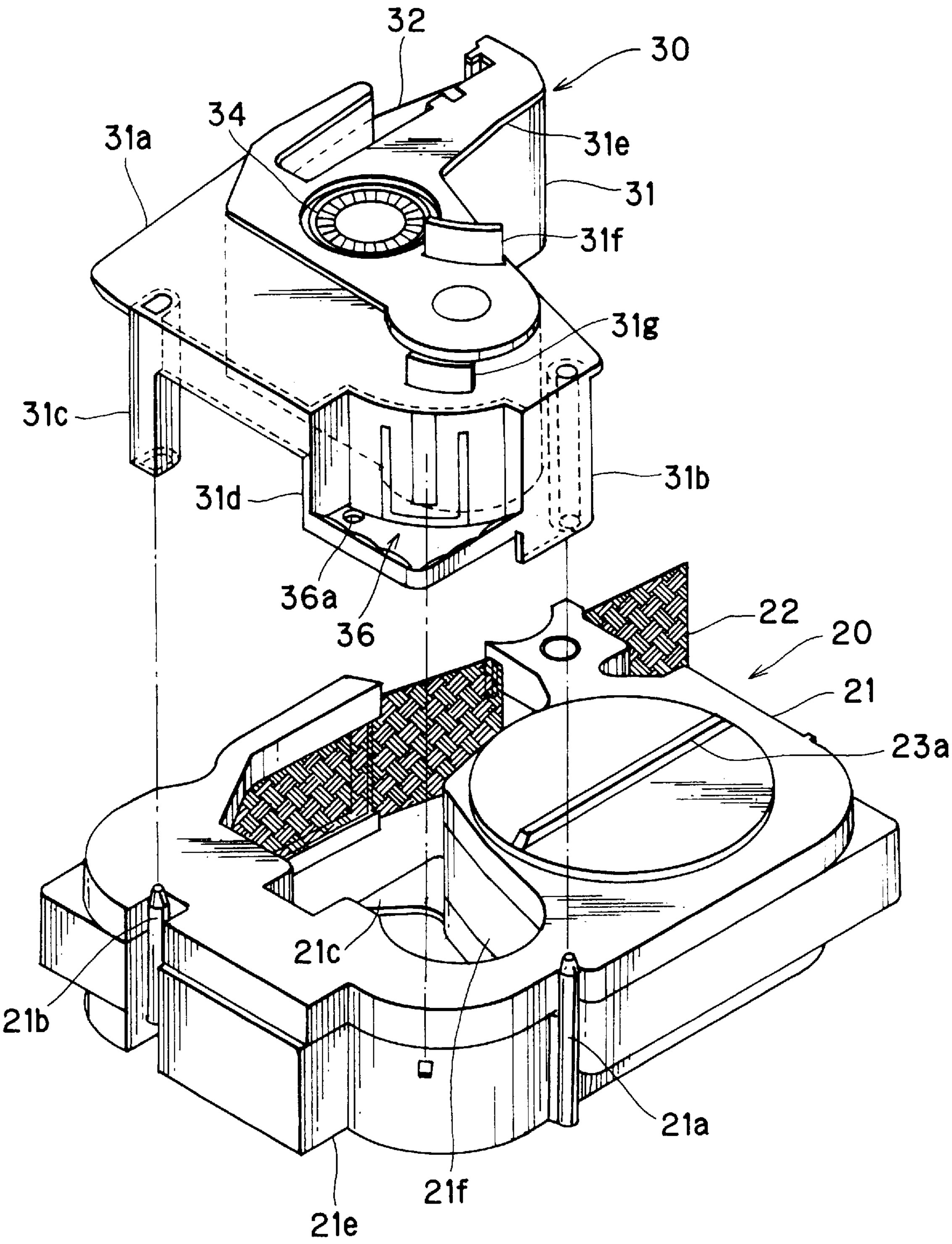
FIG. 7 is a rear perspective view showing the ribbon cassette before it is loaded into the tape cassette.

As shown in FIG. 7, a pair of guide shafts 21*a* and 21*b* are provided at positions spaced away from each other for supporting the ribbon cassette 30. Each lower end portion of the guide shafts 21*a*, 21*b* is provided integrally with an outer peripheral wall of the tape cassette 20. The ribbon cassette 30 is slidably movable in a vertical direction along the guide shafts and is supported thereby for exchanging the ribbon cassette 30 with a new ribbon cassette. Further, a pair of lower end walls 21*c* and 21*d* are formed on the tape case 21 for supporting the lower surface of the ribbon cassette 30.

Next, the ribbon cassette 30, which is removably mounted on the tape cassette 20, will be described with reference to FIGS. 2 through 8.

The ribbon cassette 30 includes a ribbon case 31 which is integrally provided with an upper wall 31*a* extending horizontally and adapted to contact with the top wall of the tape case 21. A pair of engaging feet 31*b* and 31*c*, each having a through-hole running through its entire length, extend integrally from the lower surface of the upper wall 31*a* and at edge portions thereof to fit around the pair of guide shafts 21*a* and 21*b* of the tape case 21. A vertical wall 31*d* is integrally suspended from the upper wall 31*a*. The vertical wall 31*d* is in contact with a notch 21*e* on the tape case 21. A head accommodating portion 37 is formed on the ribbon cassette 30 to accommodate the thermal head 12, which is inserted from below and passed through the tape cassette 20.

In addition, the inner portion of the ribbon case 31 is rotatably provided with a ribbon spool 33 around which the ink ribbon 32 is wound, and a take-up spool 34 for taking up the ink ribbon 32. Through an ink ribbon passage provided in the ribbon cartridge 30, the ink ribbon 32 winding over the ribbon spool 33 extends in parallel with and in the vicinity of the printing tape 22 when the ink ribbon 32 is placed against the thermal head 12, and the ink ribbon is bent in an approximate acute angle at the separation portion 35*a* of a separation member 35 provided integrally with the ribbon case 31. Thus the ink ribbon 32 is separated from the printing tape 22 and taken up by the ribbon take-up spool 34. The separation member 35 of the ribbon case 31 is positioned on the downstream side of the thermal head 12 in the tape feeding direction. A lid 31*e* is provided on the ribbon case 31 to support from above parts such as the ribbon spool 33, the take-up spool 34, and the separation member 35, etc.

A ribbon cassette accommodating portion 21*f* for accommodating the ribbon cassette 30 is formed in the tape case 21 as shown in FIG. 7. Tabs 31*f* and 31*g* are provided on the upper surface of the lid 31*e* and upper wall 31*a* of the ribbon case 31, respectively. When printing, the tape case 21 is first mounted in a recessed portion (not shown) formed in the main cover 2, and then, the ribbon cassette 30 having the desired color of ink ribbon 32 can be mounted in the ribbon cassette accommodating portion 21*f* of the tape case 21. In mounting the ribbon cassette 30 in the ribbon cassette accommodating portion 21*f*, while grasping each of the tabs 31*f* and 31*g* with two fingers, the engaging legs 31*b* and 31*c* are fitted around their corresponding guide shafts 21*a* and 21*b* via the holes running through the engaging legs 31*b* and 31*c*, and the ribbon cassette 30 is moved downward so that it is received in the ribbon cassette accommodating portion 21*f*. At this time, the upper wall 31*a* of the ribbon case 31 is resting on the top surface of the tape cassette 20, while the lower end of the ribbon cassette 30 is brought into abutment with the pair of lower end walls 21*c* and 21*d* of the tape case 21 from above, and the ribbon cassette 30 is held in a desirable position relative to the tape case 21.

With colors such as red, green, yellow, and black and ribbon widths such as 12, 18, 24, and 32 mm, a plurality of varieties of ink ribbons 32 have been prepared for the ribbon cassette 30. A group of detection holes 36 made up of a maximum of six detection holes 36*a* (the ribbon cassette of FIG. 6 only shows one detection hole 36*a*) is formed on a lower horizontal end portion of the vertical wall 31*d* on the ribbon case 31 for allowing detection of any one of these plurality of varieties of ribbon cassettes 30.

Next, a tape/ribbon transfer mechanism 40 will be described with reference to FIG. 9. The tape/ribbon transfer mechanism 40 can move the printing tape 22 and the ink ribbon 32 in the feeding direction, i.e., the printing direction, and in the rewinding direction, i.e., the direction opposite to the printing direction.

Supported rotatably on the main frame 11 are a tape take-up cam 41 engageable with the center portion of the tape spool 23, a ribbon take-up cam 42 engageable with the center portion of the ribbon take-up spool 34, and a tape drive cam 43 engageable with the center portion of the tape feed roller 24. The main frame 11 is provided with the thermal head 12, and also with a group of ribbon detection switches 103, including detection switches No. 1 through No. 6, for detecting the existence of the six detection holes 36*a* in the previously mentioned group of detection holes 36. The ribbon detection signal RS is output according to the combination of switch signals from these six detection switches. The cassette detection means is thus constructed by the group of ribbon detection switches 103 and the group of detection holes 36.

Further, a tape drive motor 44 such as a stepper motor is installed on the right front end portion of the main frame 11. Gears 46 through 53, each rotatably supported on the main frame 11 are interlocked sequentially with a drive gear 45 of the tape drive motor 44. A gear 55 and a tape drive gear 54 coupled to the tape drive cam 43 are meshedly engaged with the gear 53. Among these gears, gears 48 and 49 are provided integrally and are fixed to the lower end portion of the ribbon take-up cam 42. Gears 50 and 51 are provided integrally. Additionally, tape take-up gear 52 is fixed to the lower end portion of the tape take-up cam 41. Thus, the rotation of the tape drive motor 44 is transmitted to the tape drive cam 43 fixed to the tape drive gear 54 via the gears 45 through 54. Accordingly, the printing tape 22 is moved by the rotation of the tape feed roller 24.

A swing lever 56 is provided. The swing lever 56 has a base portion supported in a space between the gears 50 and 51 integral therewith. An appropriate amount of frictional resistance is provided between the swing lever 56 and the two gears. The swing lever 56 is rotatably provided with a planet gear 57 continuously engaged with the gear 51. The gear 53 has a rotation shaft 58 to which a base end portion of a cut-restricting lever 84 is urgedly supported. That is, the cut-restricting lever 84 supports thereon a torsion spring 59, and one end of the torsion spring and the base end of the lever 84 interpose therebetween the shaft 58, so that the base end of the cut restricting lever 84 is urgedly pressed against the shaft 58 by the biasing force of the torsion spring 59.

Figure 9:
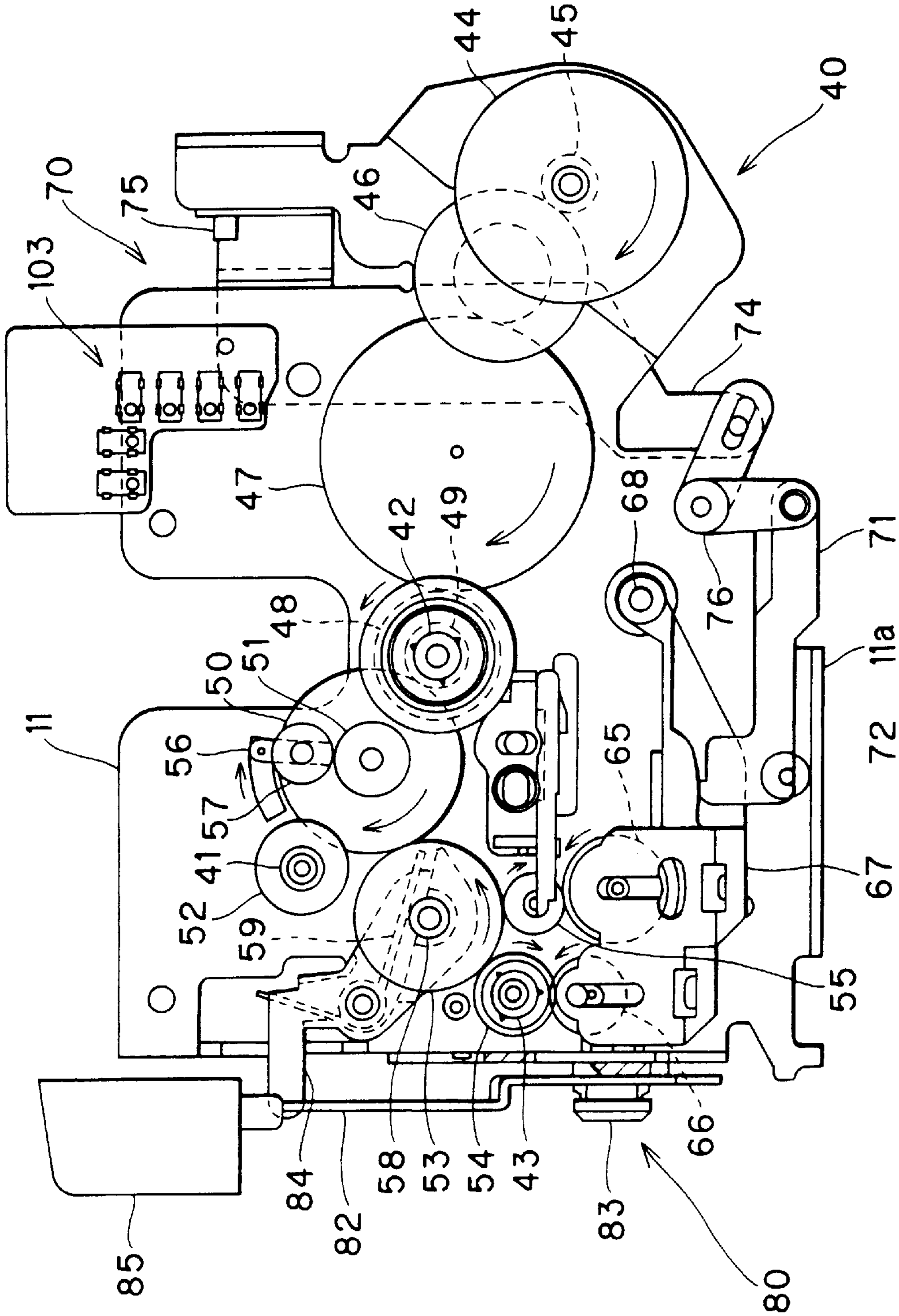
FIG. 9 is a plan view showing a drive system of the thermal printing mechanism in the printing state.
Figure 10:
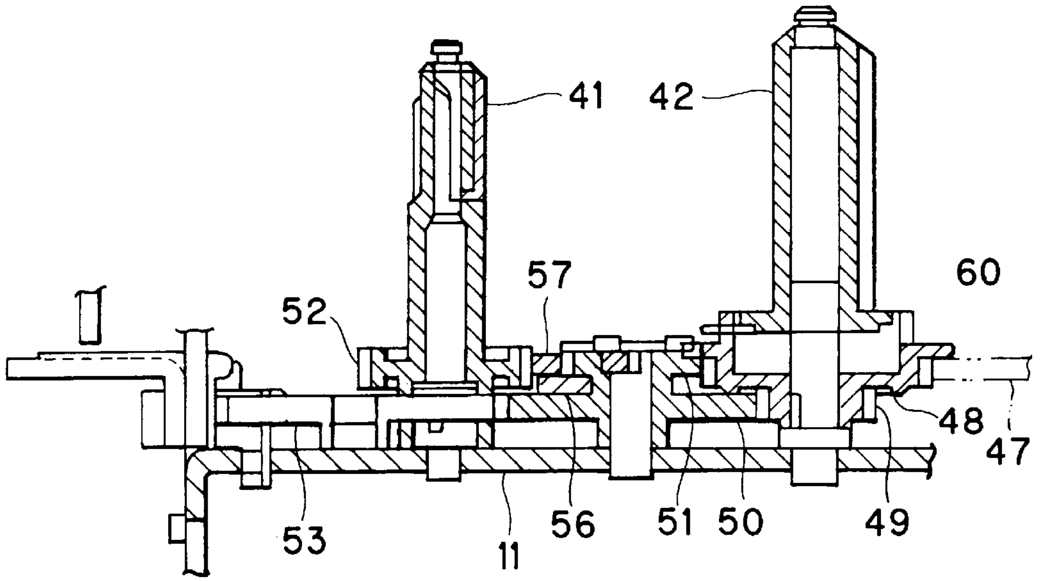
FIG. 10 is a vertical cross-sectional front view showing a gear engaging relation of essential portions in FIG. 9.

As shown in FIG. 9, when the tape drive motor 44 is driven in the clockwise direction for normal printing operation, the gear 50 rotates in the clockwise direction. In this case, the swing lever 56 is pivoted in the clockwise direction about an axis of the gear 51 because of the frictional force in association with the gears 50 and 51. Consequently, the planet gear 57 is disengaged from the tape take-up gear 52 to render the tape take-up cam 41 free. Accordingly, the printing tape 22 wound over the tape spool 23 can be paid out (no take-up force is imparted to the take-up cam 41). At the same time, the gear 53 is rotated in the counterclockwise direction, so that the cut restricting lever 84 is pivoted about an axis of the shaft 53 in the counterclockwise direction. Consequently, the end portion of the cut restricting lever 84 is brought into a position immediately below a cutting lever 82 described later, thus restricting cutting operations. At the same time, because of the rotation in the counterclockwise direction of the ribbon drive gear 48, the ribbon take-up cam 42 is also rotated in the counterclockwise direction, via a clutch spring 60. Therefore, the ink ribbon 32 is taken up by the ribbon take-up spool 34.

A roller holder 67 for rotatably supporting a rubber platen roller 65 and a rubber tape feeding subroller 66 is pivotably supported on the main frame 11 by a pivot shaft 68. A release lever 71 is provided movably in the leftward and rightward direction in interlocking relation to the opening and closing motion of the cassette cover 3. The release lever 71 changes its position between a printing position shown in FIG. 9 and a release position shown in FIG. 11.

The roller holder 67 is normally biased toward its release position by a spring not shown in the drawings. A wheel roller 72 rotatably attached to the release lever 71 is in contact with an upstanding wall 11*a* of the main frame 11. At the same time, a free end of the release lever 71 is in contact with the roller holder 67 from the rear side. Therefore, when the release lever 71 is moved in the left direction from a release position shown in FIG. 11 to an operating position shown in FIG. 9, the left end of the release lever 71 is wedged between the roller holder 67 and the upstanding wall 11*a*, so that the roller holder 67 is changed from its release position to its printing position. At this time, the platen roller 65 presses against the thermal head 12 through the printing tape 22 and the ink ribbon 32, and the tape feeding subroller 66 presses against the tape feeding roller 24 through the printing tape 22.

When the roller holder 67 is changed to the printing position, a platen gear (not shown in the drawings) fixed to the lower end portion of the platen roller 65 is brought into meshing engagement with the gear 55, and a subroller gear (also not shown) fixed to the lower end portion of the tape feeding subroller 66 is brought into meshing engagement with the tape drive gear 54.

Next, a head release mechanism 70 will be described with reference to FIG. 9 and FIGS. 11 through 13. The head release mechanism 70 is adapted for moving the roller holder 67 to its release position with respect to the thermal head 12 by moving the release lever 71 rightwardly in accordance with the opening movement of the cassette cover 3.

Figure 12:
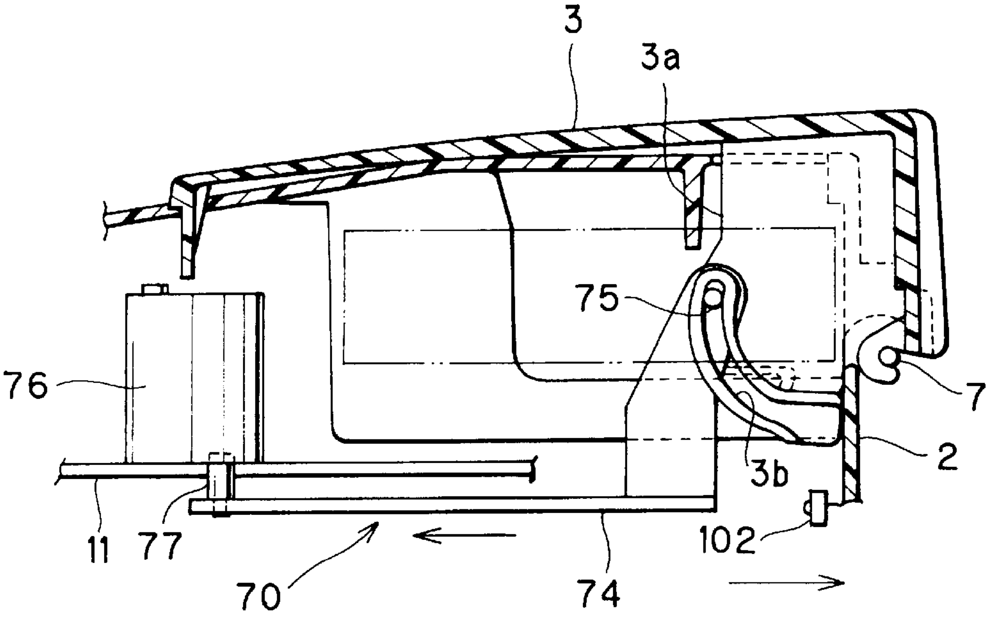
FIG. 12 is a vertical cross-sectional side view showing essential portions when the cassette cover is closed.
Figure 13:
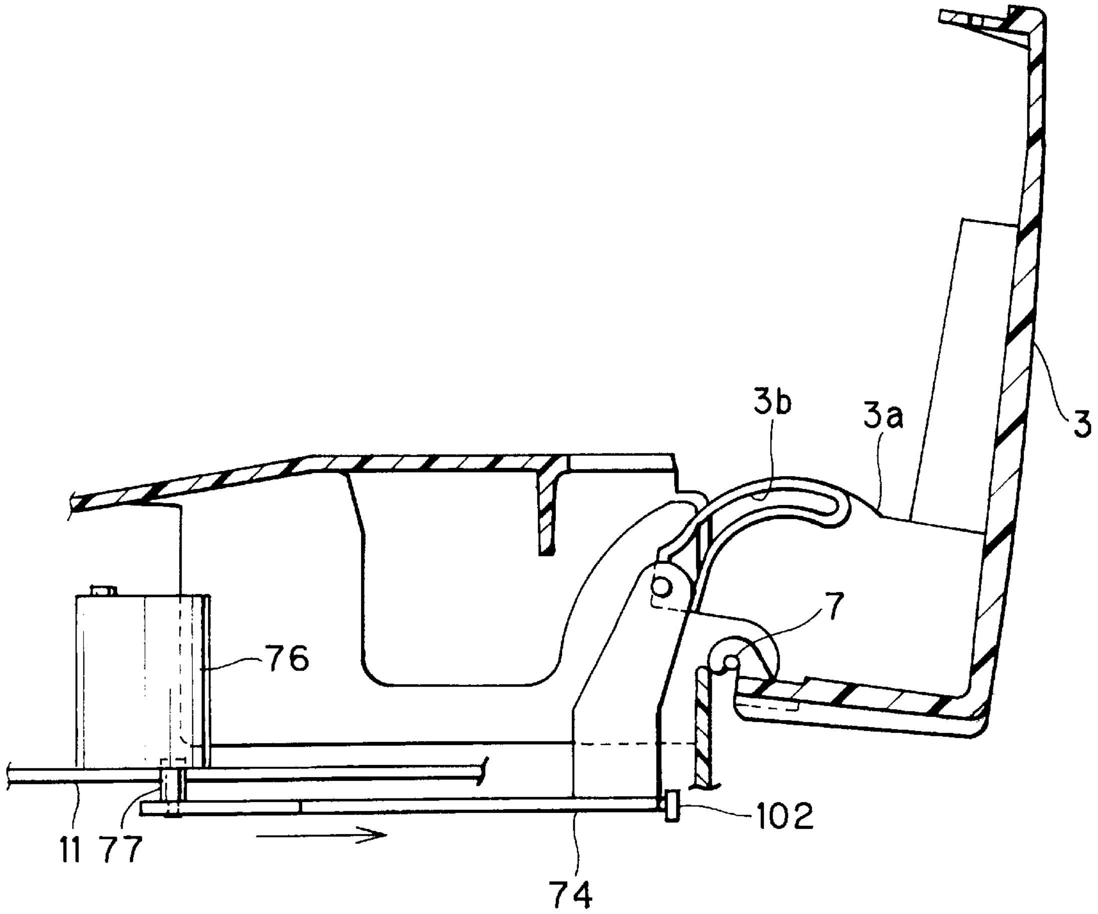
FIG. 13 is a vertical cross-sectional side view showing the essential portions when the cassette cover is open.

As shown in FIGS. 12 and 13, the rear portion of the cassette cover 3 is supported in a plurality of places by the pivotal pin 7 attached on the main cover 2 so that the cassette cover 3 can open and close. A curved, grooved cam 3*b* is formed on the right side wall 3*a* of the cassette cover 3. An operation plate 74 is positioned on the right, underside of the main frame 11, and an engaging pin 75 engageable with the grooved cam 3*b* is fixed to the rear end portion of the operation plate 74. The right end portion of the release lever 71 is pivotally supported on one arm of a forked lever 76. The forked lever 76 has the other arm connected to the operation plate 74 via a pin 77 fixed to the front end portion of the operation plate 74.

In a state where the cassette cover 3 is closed as shown in FIG. 12, in other words, in a state where the roller holder 67 is in the printing position shown in FIG. 9, if the cassette cover 3 is then opened as shown in FIG. 13, the engaging pin 75 engaged with the grooved cam 3*b* is moved rearwardly by the movement of this grooved cam 3*b*. Therefore, the operation plate 74 is moved rearwardly, and the forked lever 76 is pivoted in the counterclockwise direction. As a result, the roller holder 67 is moved rightwardly so that the roller holder 67 is changed to the release position. When the operation plate 74 is moved rearwardly, a cover open and close signal VS of "H" level is output from a cover open and close detection switch 102.

Figure 11:
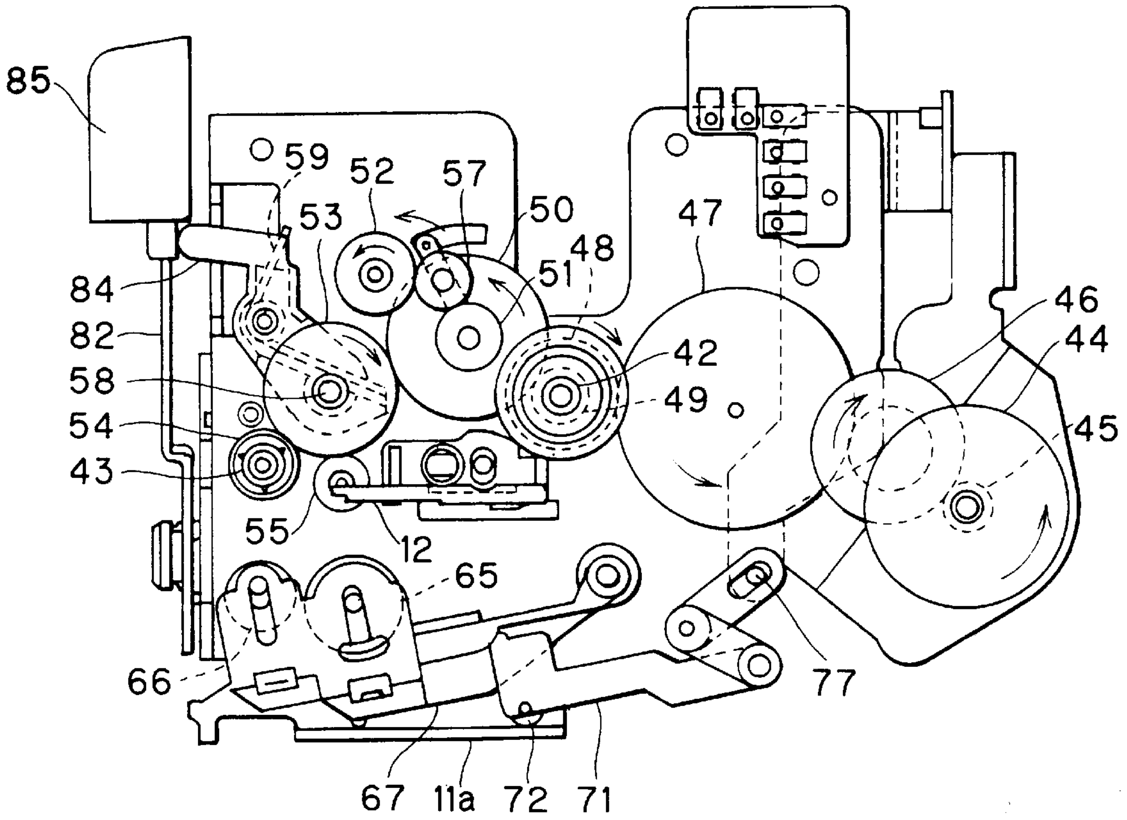
FIG. 11 is a plan view showing the drive system of the thermal printing mechanism in the tape rewinding state.

Further, when the cassette cover 3 is in the open position shown in FIG. 13, in other words when the roller holder 67 is in the release position shown in FIG. 11, and the cassette cover 3 is then closed, as shown in FIG. 12, the engaging pin 75 is moved frontwardly by the movement of the grooved cam 3*b*. Therefore, the operation plate 74 is moved frontwardly, and the forked lever 76 is pivoted in the clockwise direction from the position shown in FIG. 11. The roller holder 67 is changed to the printing position, or non-release condition, in response to the movement of the release lever 71 in the leftward direction.

Figure 2:
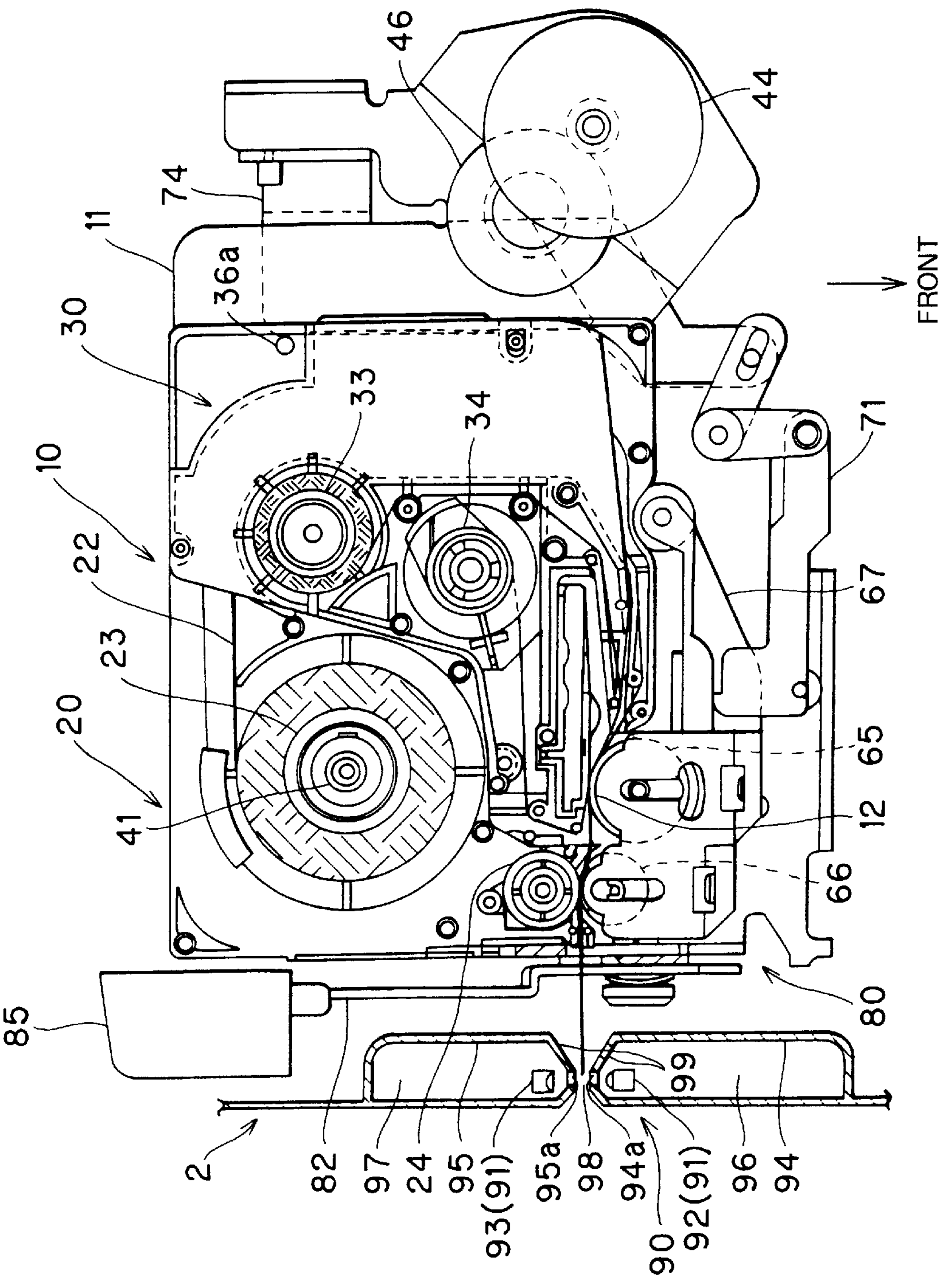
FIG. 2 is a plan view showing a thermal printing mechanism in the printing state.

As shown in FIGS. 2 and 9, for performing a printing operation, the tape cassette 20 is first mounted on the thermal printing mechanism 10. Then, the ribbon cassette 30 is mounted on the tape cassette 20. When the cassette cover 3 is closed, the roller holder 67 is shifted to the printing position.

From this position, when the tape drive motor 44 is driven in its normal printing direction, i.e., in the clockwise direction, each of the gears 45 through 55 is driven to rotate in its prescribed direction. The platen roller 65 and the tape feeding subroller 66 are each rotated in the counterclockwise direction. Further, because the tape feeding subroller 66 and the tape feeding roller 24 are in synchronous rotation, the tape passes by the tape cutting mechanism 80 and the tape detection mechanism 90 and is discharged outside, while the printing tape 22 is being printed on by the thermal head 12.

During this time, the tape take-up cam 41 is free, and, therefore, the printing tape wound over the tape spool 23 is continually supplied with no resistance. At the same time, and at the same pace as the printing tape 22, the ink ribbon 32 is supplied from the ribbon spool 33 by the rotating motion of the platen roller 65. The ink ribbon 32 is then taken up by the ribbon take-up spool 34 engaged with the ribbon take-up cam 42 which is rotated by the ribbon take-up gear 48.

Figure 3:
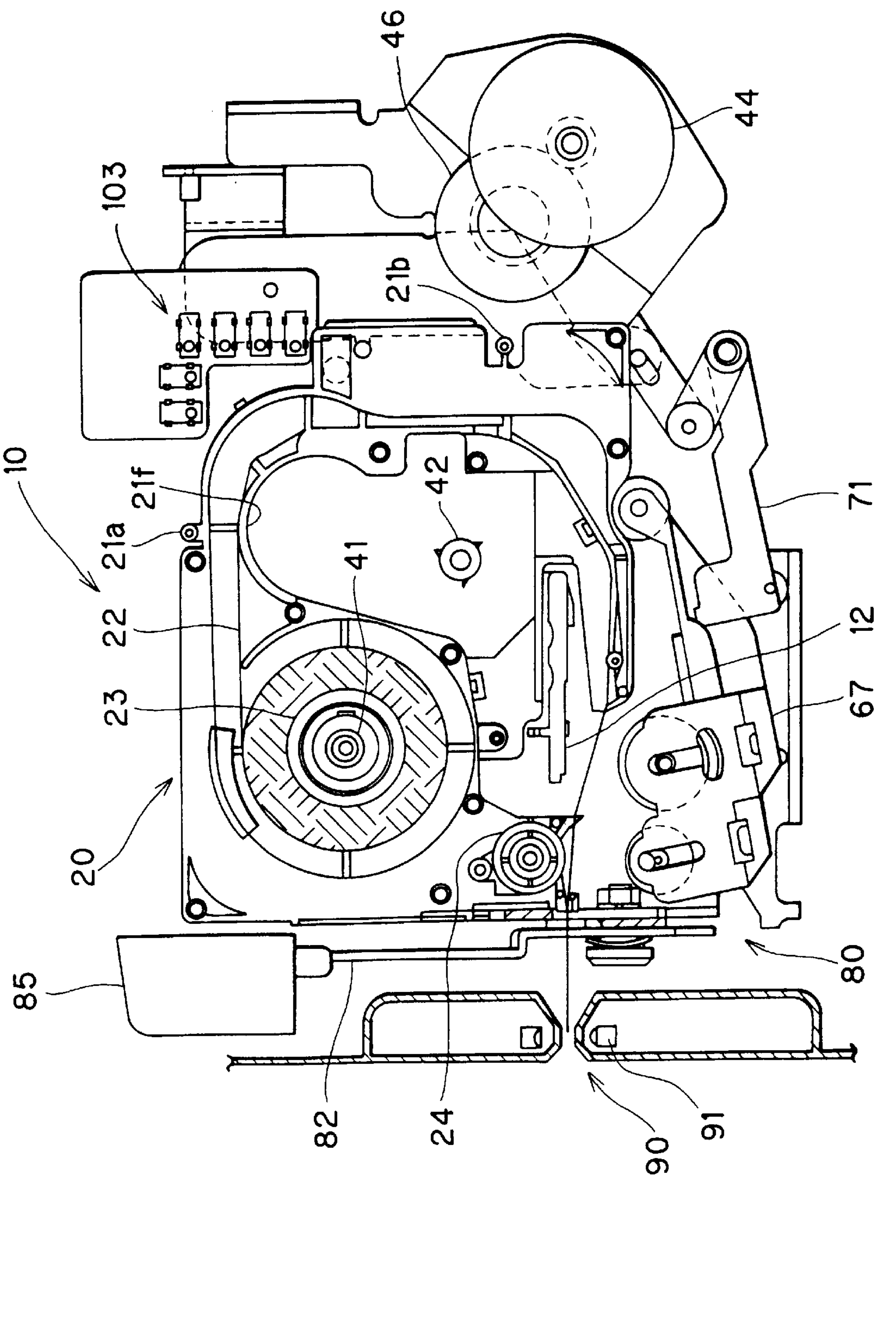
FIG. 3 is a plan view showing the thermal printing mechanism in a tape rewinding state.
Figure 4:
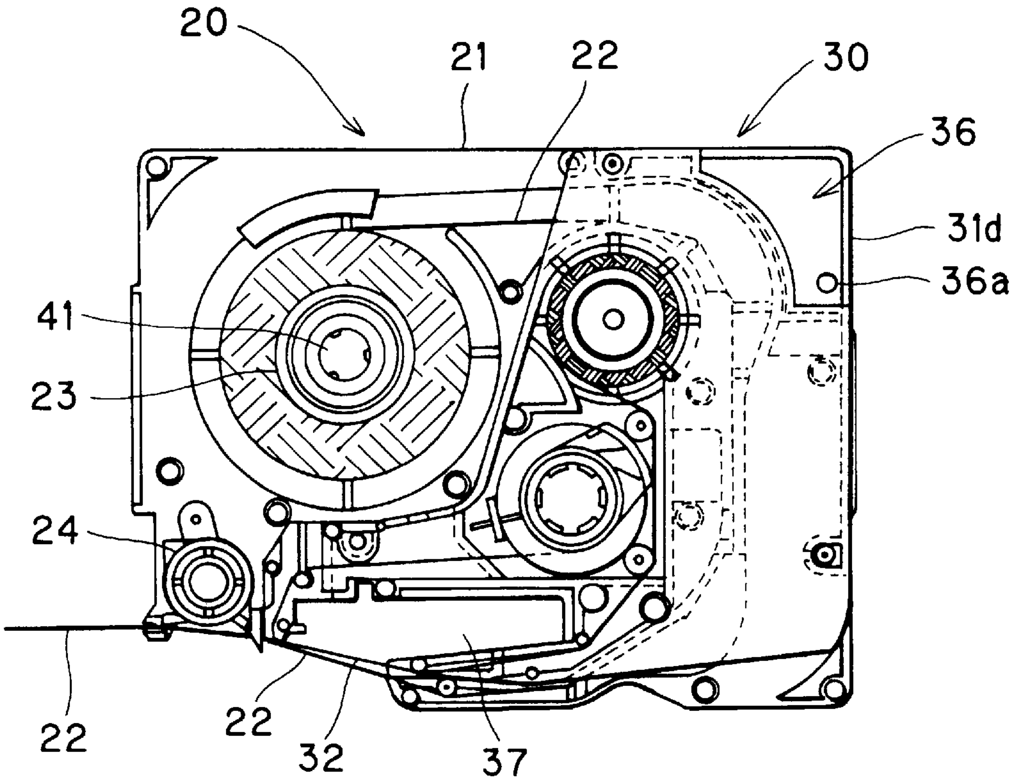
FIG. 4 is a plan view showing a tape cassette mounted with a ribbon cassette.
Figure 5:
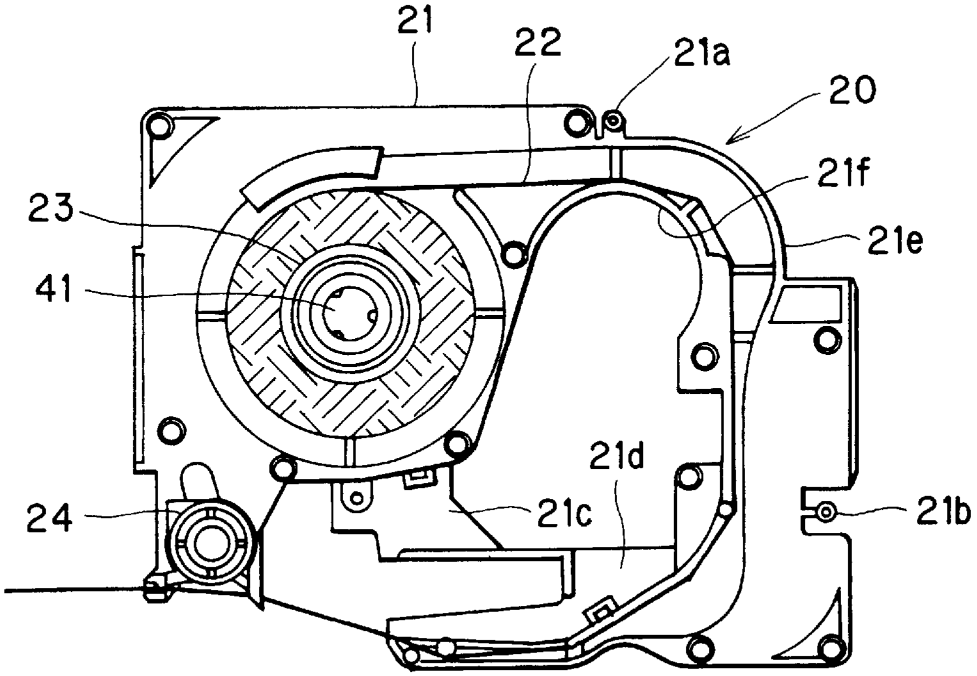
FIG. 5 is a plan view showing the tape cassette.
Figure 6:
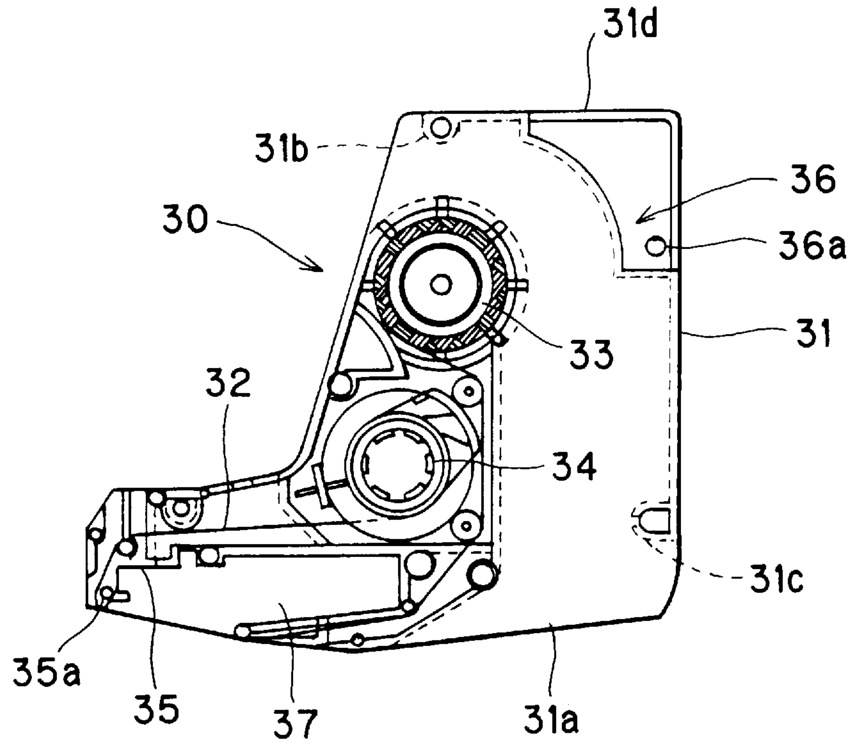
FIG. 6 is a plan view showing an internal arrangement of the ribbon cassette.
Figure 8:
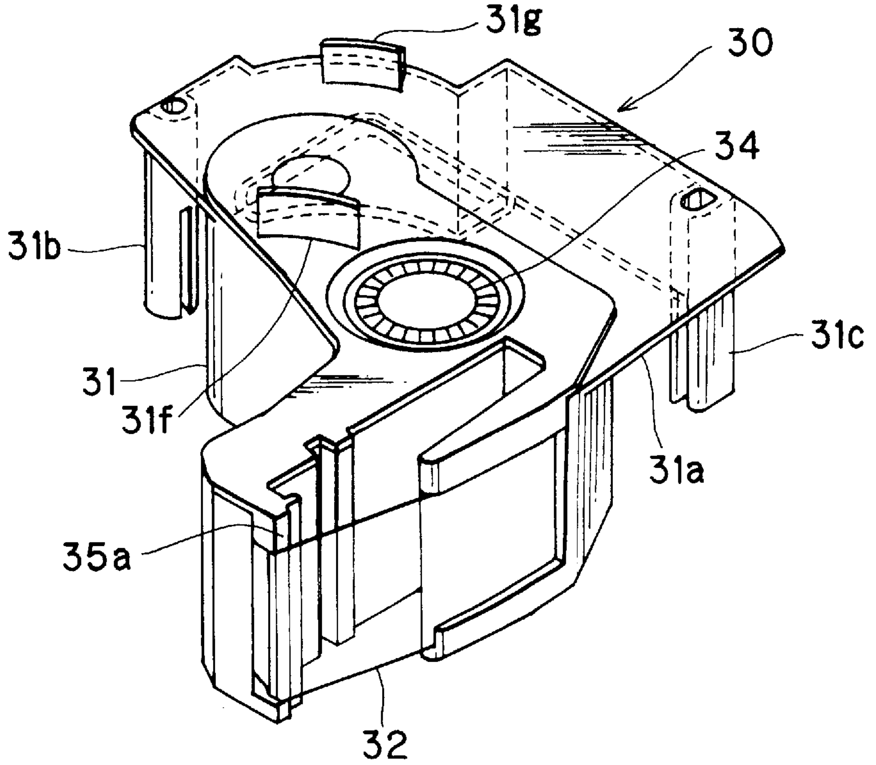
FIG. 8 is a perspective view showing the ribbon cassette.

After the printing of the first color is completed and the second color is to be printed, the cassette cover 3 is released. When the ribbon cassette 30 is removed, the roller holder 67 is changed to the release position by the head release mechanism 70. Then, when the tape drive motor 44 is driven to rotate in the counterclockwise direction, (the tape rewinding direction), each of the gears 45 through 55 is driven to rotate in its prescribed direction, as shown in FIGS. 3 and 11.

As a result of the gear 50 rotating in the counterclockwise direction, the swinging lever 56 is also pivoted in the counterclockwise direction to bring the planet gear 57 into meshing engagement with the tape take-up gear 52. Accordingly, the tape take-up cam 41 is rotated in the counterclockwise direction. Thus, the printing tape 22 that has been printed on once is taken up by the tape spool 23. At this phase, the ribbon take-up gear 48 is driven in the clockwise direction. However, the ribbon cassette 30 has been removed, and, thus, the ink ribbon 32 taken up by the ribbon take-up spool 34 is not supplied.

Figure 14:
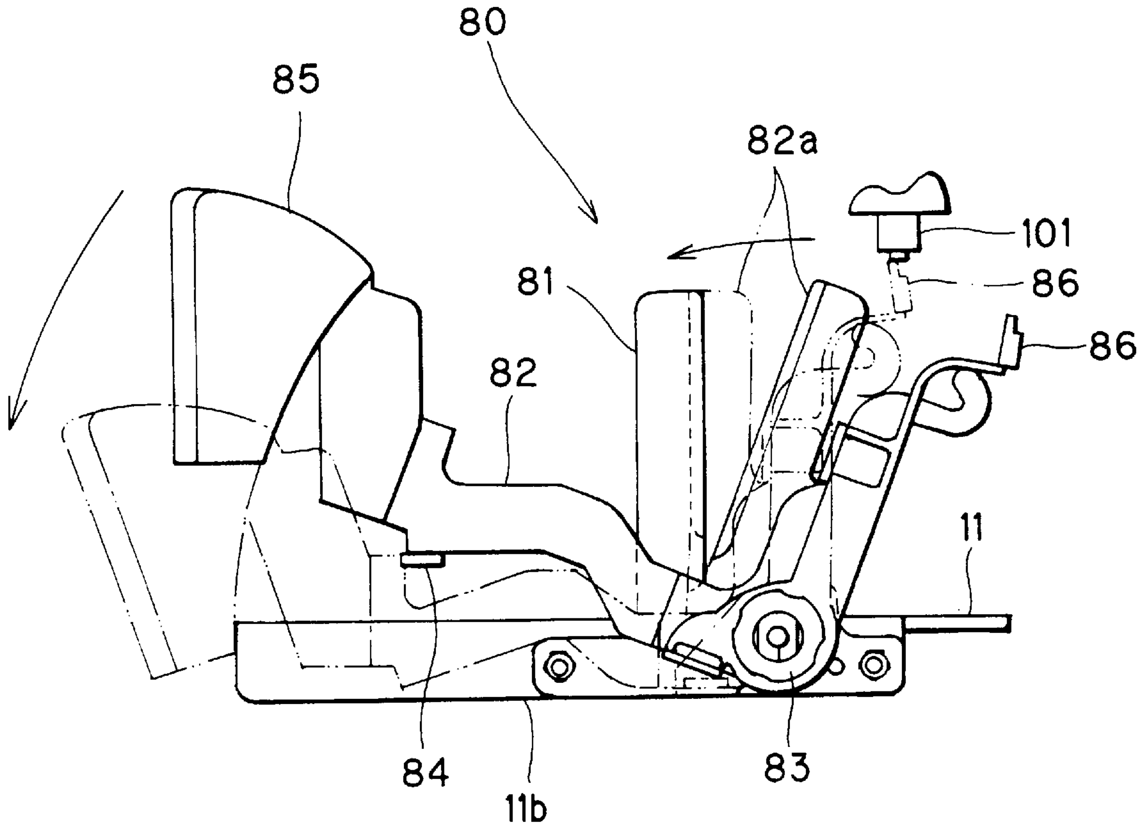
FIG. 14 is a side view showing a tape cutting mechanism of the thermal printing mechanism.

Next, a tape cutting mechanism 80 for cutting the printing tape 22 that has been printed on will be described with reference to FIGS. 14 and 15.

The main frame 11 has a left end wall 11*b* which is provided by partially bending downwardly the left end portion of the frame 11, and a lower end of a fixed blade 81 is fixed to the left end wall 11*b*. A cutting lever 82, which, from the side view, looks like an abbreviated L shape, has a base end portion pivotally supported by a screw 83 to the left end wall 11*b*. A movable blade 82*a* is formed on the cutting lever 82. As shown in FIG. 9, during the printing process, gear 53 rotates in the counterclockwise direction, moving the end portion of the out restricting lever 84 to the under side of the cutting lever 82 and, thus, restricting the cutting operation.

Figure 15:
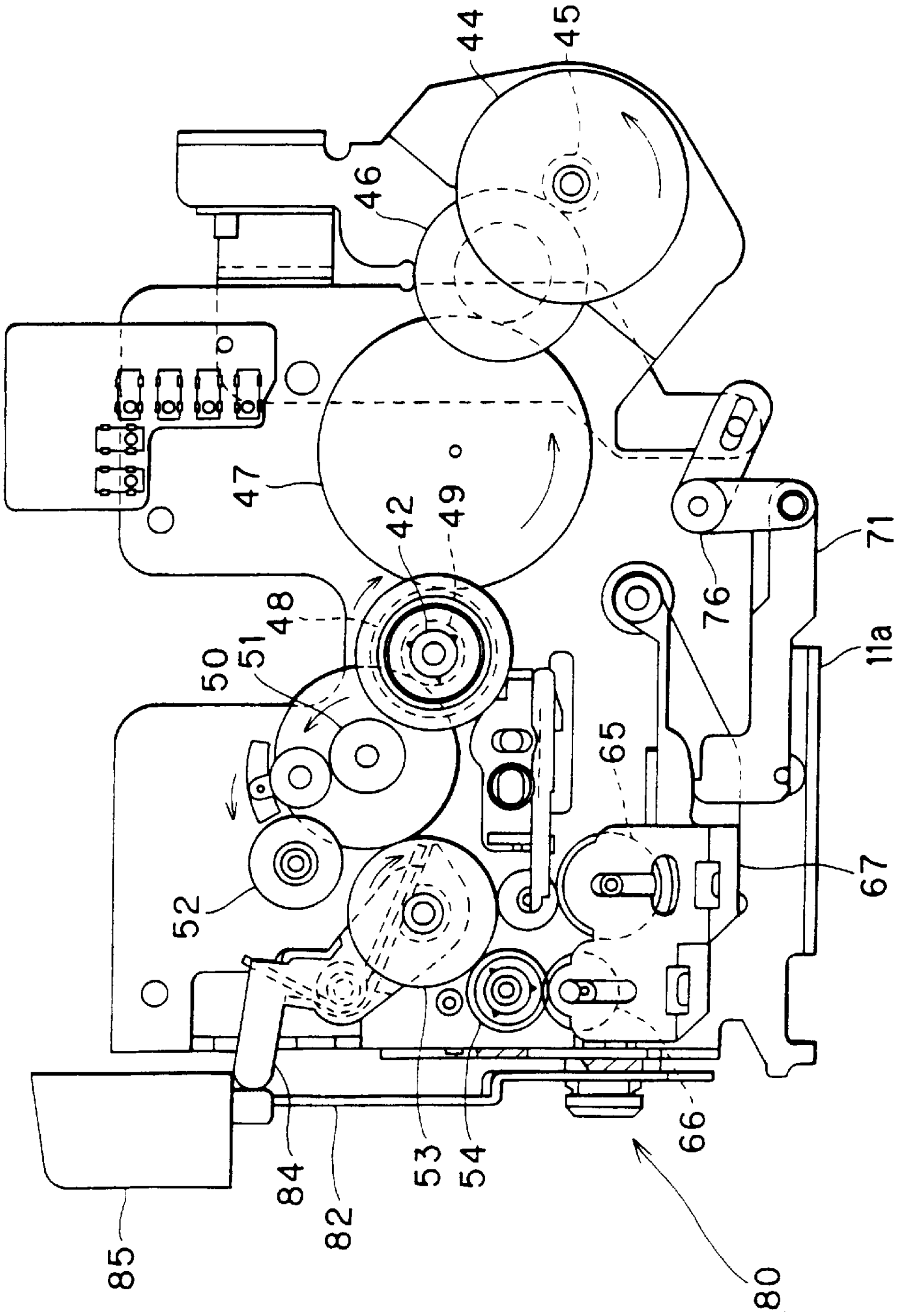
FIG. 15 is a plan view showing the drive system of the thermal printing mechanism in the tape cutting permission state.

However, when printing is completed and the tape drive motor 44 is rotated only slightly in the rewinding direction, gear 53 is rotated slightly in the clockwise direction as shown in FIG. 15, displacing the end portion of the cut restricting lever 84 from underneath the cutting lever 82 to allow cutting operations. When the cutting button 85 on the end portion of the cutting lever 82 is pushed downward as shown in FIG. 14, the movable blade 82*a* is pivoted to the cutting position indicated by a two dotted chain line. The printing tape 22 positioned between the fixed blade 81 and the movable blade 82*a* is cut through the force of these two blades. A cutting detection switch 101 installed on the main frame 11 is operated by an operation member 86 installed on the cutting lever 82 and outputs a cutting detection signal CS. After releasing pressure on the cutting lever 82, the cutting lever 82 is pivoted back to its original prescribed position indicated by the solid line, by urging force of a spring not shown.

Next, a tape detection mechanism 90, which is provided on the outer side of the tape cutting mechanism 80 to detect the existence of the printing tape 22, will be described with reference to FIG. 2.

Guiding members 94 and 95 are provided integrally with the main cover 2 at a position outside the tape cutting mechanism 90. The guiding members 94 and 95 are designed to form a tightly sealed pair of sensor accommodating chambers 96 and 97. A light emitting element 92 is installed in the sensor accommodating chamber 96, while a light receiving element 93 is installed in the sensor accommodating chamber 97. A slit 98 is formed between the pair of guiding members 94 and 95 to allow the printing tape 22 to pass therethrough. Light transmitting holes 94*a* and 95*b* having a small diameter are formed in the guide members 94, 95 in a confronting relation to each other. The slanted guides 99 are also formed at these confronting portions. The leading end of the printing tape 22 passing through the tape cutting mechanism 80 will reliably pass through this slit, because of the formation of the guides 99, so that the printing tape 22 can be accurately detected.

At this point, the sensor light emitted from the light emitting element 92 passes through the light transmitting holes 94*a* and 94*b* formed in the sensor accommodating chambers 96 and 97, and is received on the light receiving element 93. Therefore, when the printing tape 22 proceeds into the tape detection sensor 91, and the printing tape 22 is positioned between the light emitting element 92 and the light receiving element 93, the sensor's light is interrupted by the printing tape. Thus, the tape detection sensor 91 outputs an "L" level tape detection signal TS.

Figure 16:
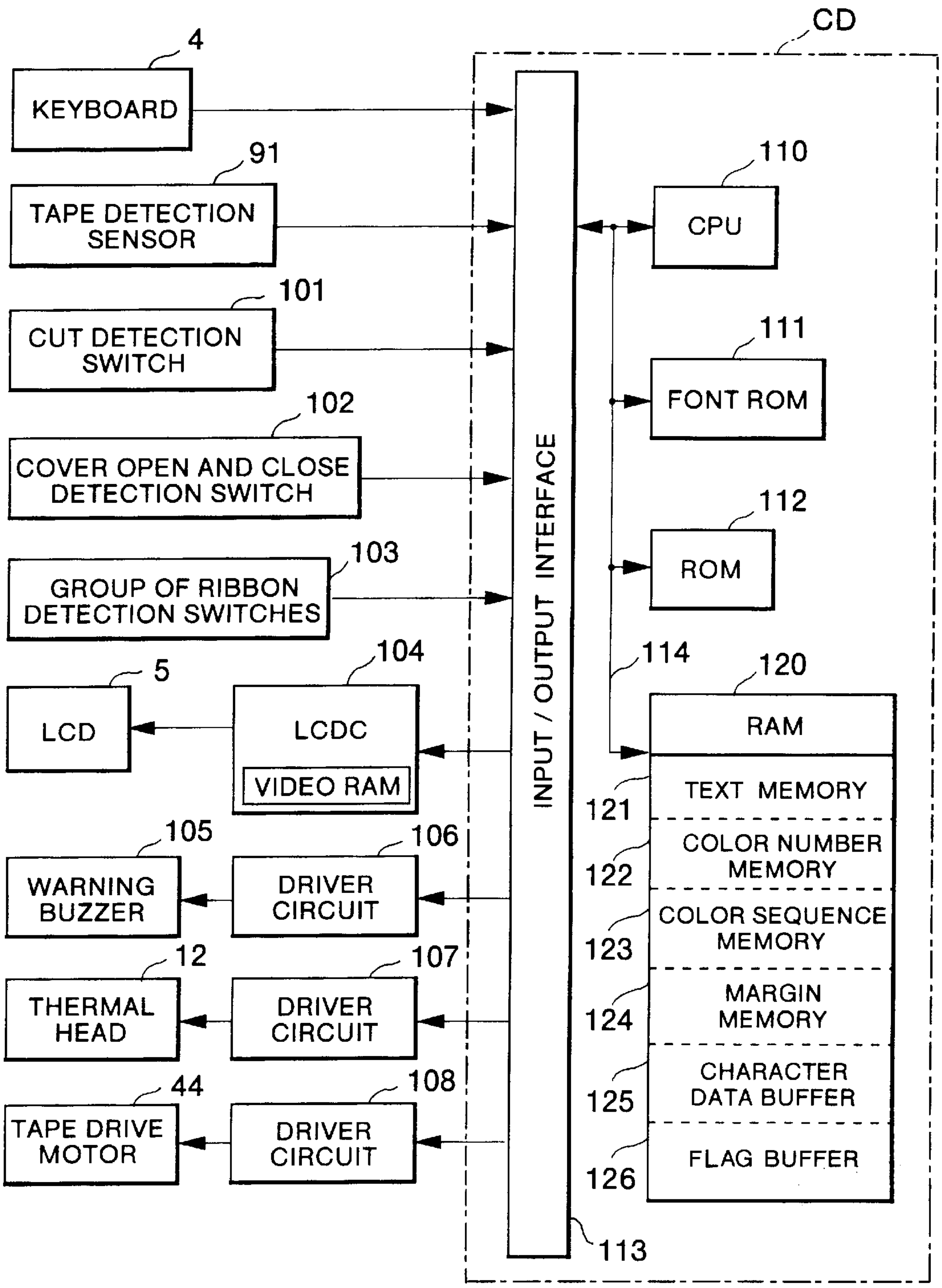
FIG. 16 is a block diagram showing a control system of the tape-shaped label printing device.
Figure 17:
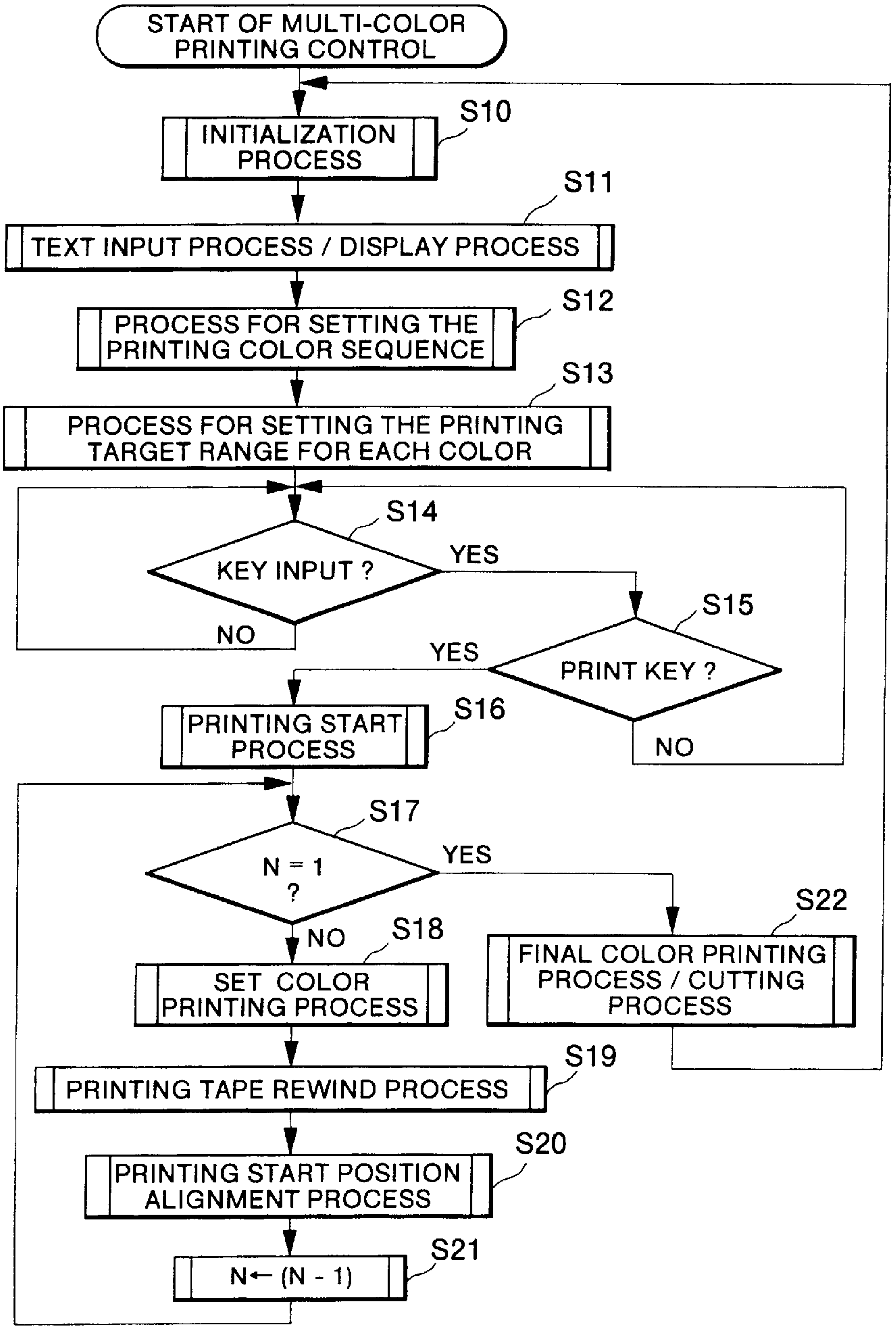
FIG. 17 is a general flowchart representing a multi-color printing control routine.

The control system of the tape-shaped label printing device 1 is configured as shown in the block diagram of FIG. 16.

Connected to an input/output interface 113 of a control device CD are the keyboard 4, the tape detection sensor 91, the cutting detection switch 101, the cover open and close detection switch 102, the group of ribbon detection switches 103, a display controller (LCDC) containing a video RAM for outputting display data to the liquid crystal display (LCD) 5, a driver circuit 106 for a warning buzzer 105, a driver circuit 107 for driving the thermal head 12, and a driver circuit 108 for the tape drive motor 44.

The control device CD includes a CPU 110, the input/output interface 113 is connected, via buses 114 including a data bus, to the CPU 110, a font ROM 111, a ROM 112, and a RAM 120.

The font ROM 111 stores dot pattern data for display, concerning all of the numerous characters, such as the alphabetic characters and symbols, and dot pattern data for printing in a plurality of printing character sizes.

The ROM 112 stores a display drive control program for controlling the display controller 104 to respond to the code data of alphabetic characters, symbols, numbers, and other characters input from the keyboard 4, a printing control program to create dot pattern data, for printing, of the characters, symbols, and the like stored in a text memory 121, a printing drive control program for outputting the created dot pattern data for each row of dots in sequence to the thermal head 12, the tape drive motor 44, and the like for printing, and a control program described later for controlling printing of multiple colors.

Incidentally, the ROM 112 stores a ribbon cassette detection table for detecting the color and width of the ink ribbon 32, based on the ribbon detection signal RS output from the group of ribbon detection switches 103, including detection switches Nos. 1 through 6.

The text memory 121 of the RAM 120 stores text data, such as alphabetic characters and symbols, input from the keyboard 4, in correspondence to the data for the printing color selected. A color number memory 122 stores data of the number of printing colors inputted. A printing color sequence memory 123 stores data of the printing color sequence selected. A margin memory 124 stores data of the size of the margin selected, where the front or top margin and rear or bottom margin are identical to each other. A printing data buffer 125 stores the developed dot pattern data corresponding to the character codes stored in the text memory 121. Further, the RAM 120 is provided with a memory for temporarily storing such data as the results of computation by the CPU 110.

Next, multi-color printing control routines carried out in the control device CD of the tape-shaped label printing device 1 will be described with reference to flowcharts of FIGS. 17 through 25. Incidentally, the symbols Si (i=10, 11, 12 . . . ) in the flowcharts indicate steps.

Figures 26, 27:
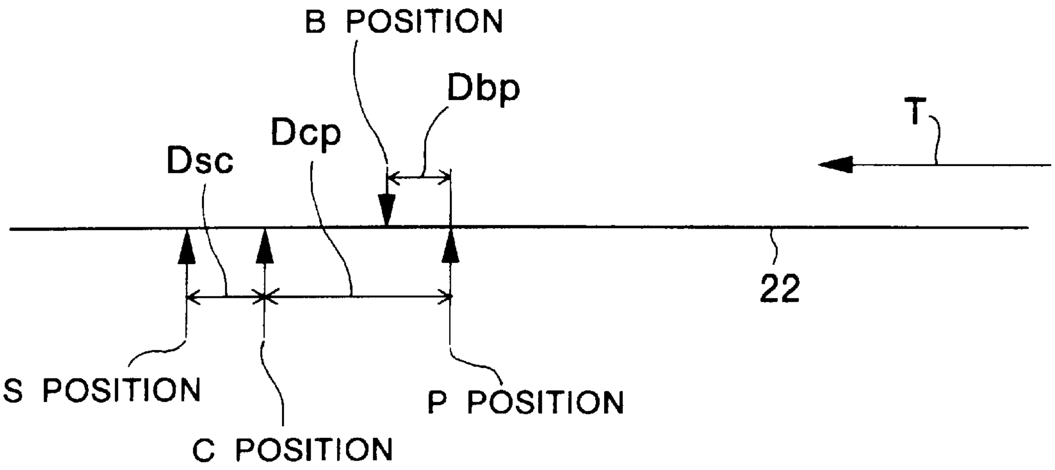
FIG. 26 is an explanatory diagram showing the positioning relationship between a printing position (P position), a tape cutting position (C position), and a tape detection position (S position)
FIG. 27 is an explanatory diagram showing the data configuration of color setting in the text memory.

Before entering into a substantive description as to the multi-color printing control, an explanation will be given based on FIG. 26, which shows the position of tape detection by the tape detection sensor 91, the position of tape cutting by the tape cutting mechanism 80, and the position of printing by the thermal head 12. Beginning on the upstream side in a feeding direction T of the printing tape 22, the positioning order is the printing position (P position), the tape cutting position (C position), and the tape detection position (S position). The distance (print-cut distance) between the printing position and the tape cutting position, or Dcp, is about 25 mm. The distance (cut-detection distance) between the tape cutting position and the tape detection position, or Dsc, is about 15 mm. Further, the separation position (B position), according to the separation portion 35*a* of the separation member 35, is about 6 mm downstream from the printing position in the feeding direction T.

When electrical power is supplied into the tape-shaped label printing device 1, first an initialization process is performed to initialize such devices as the thermal printing mechanism 10 and the control device CD (S10). Then, the text input screen is displayed on the display 5. After setting printing styles, processes such as the input process for inputting text data and the display process for displaying the input text are carried out. The input text data is stored in the text memory 121 (S11). For example, as shown in FIGS. 27(*a*) and 27(*b*) input text data of "AB" "CDE" and "FG" are stored in the text memory 121.

Figure 18:
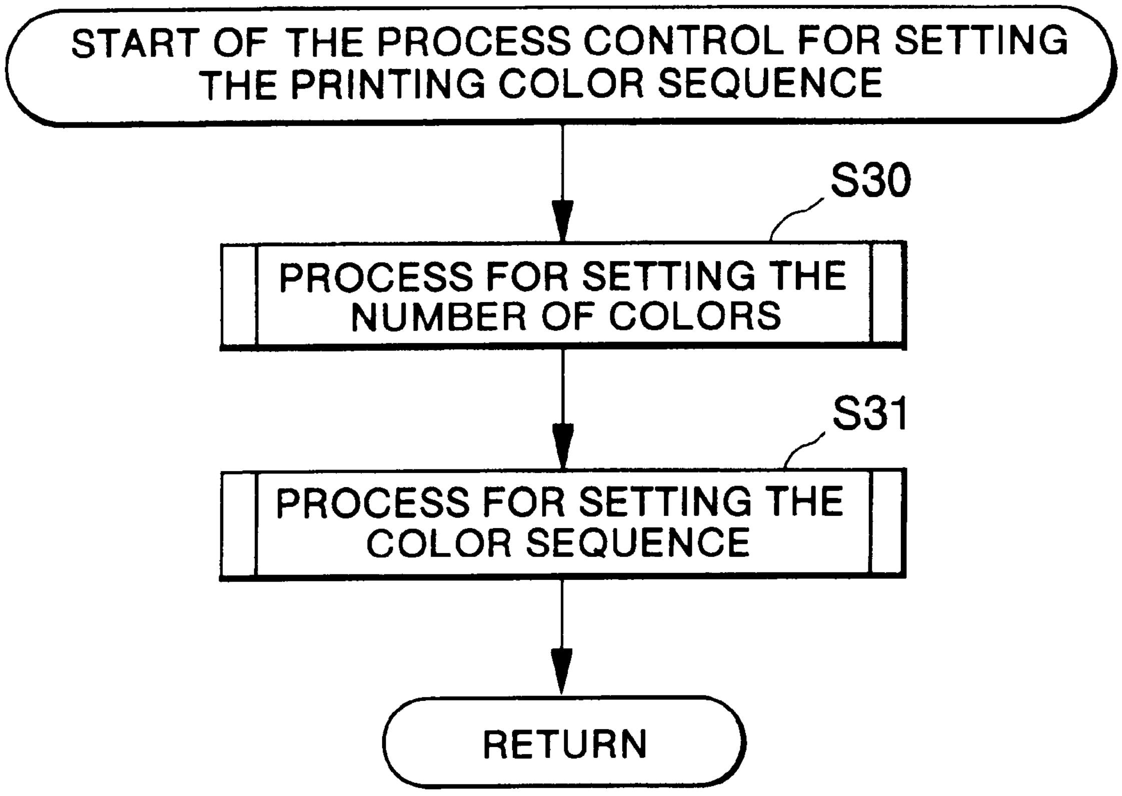
FIG. 18 is a flowchart representing a process control for setting the printing color sequence.

Next, the process control for setting the printing color sequence (S12) shown in FIG. 18 is executed.

When this control begins, the message "Number of colors?" is displayed on the display 5, and the process for setting the number of colors is executed to set the number N of colors by using the numeric keys. The number N of colors set is stored in the color number memory 122 (S30). Next, the names of a plurality of colors are displayed on the display 5, and the process for setting the color sequence is executed to set the order of the color sequence to be supplied in printing. The set color sequence data is stored in the printing color sequence memory 123 (S31). Control is then returned to the multi-color printing control (S13).

Figure 19:
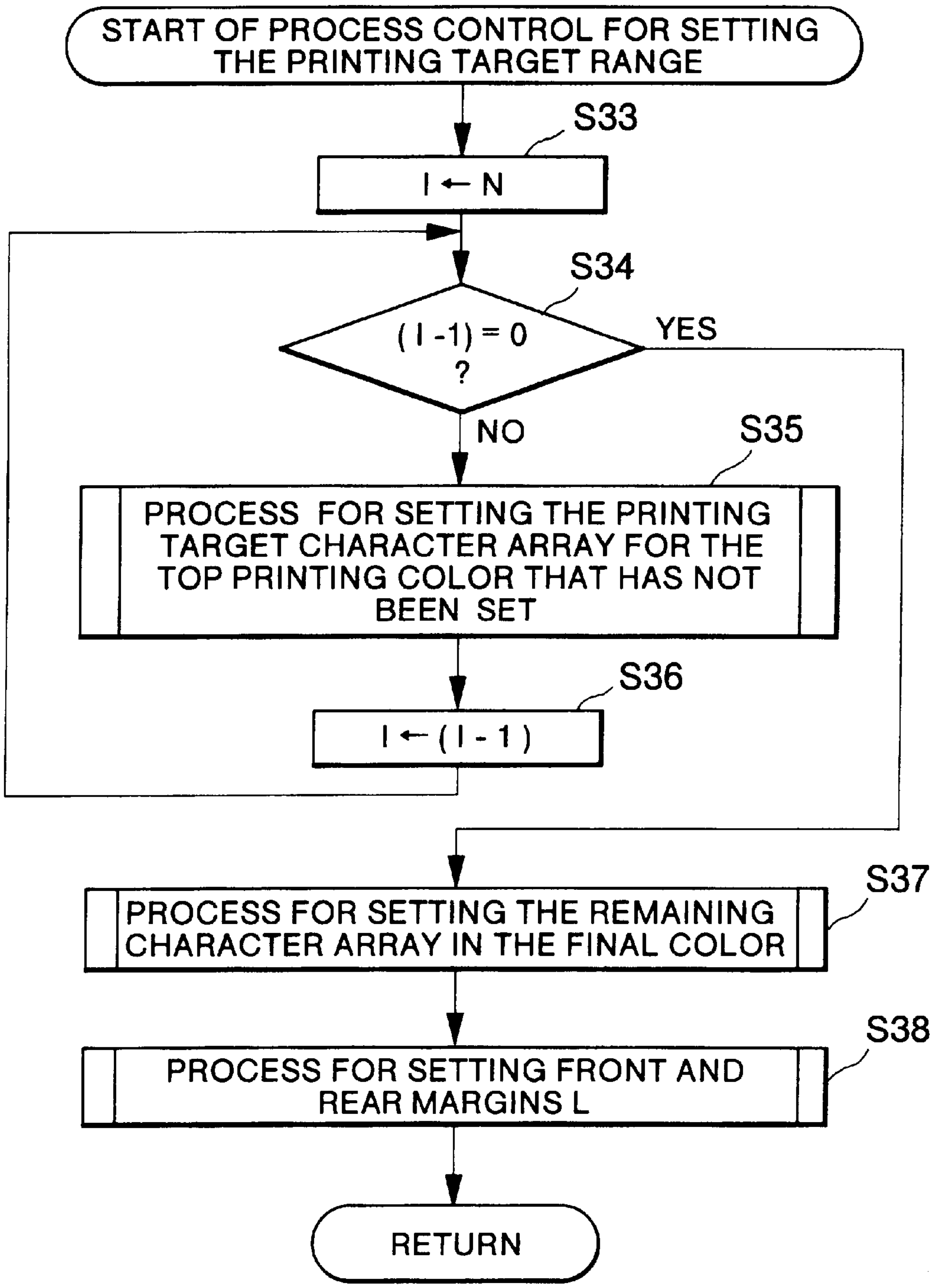
FIG. 19 is a flowchart representing a process control for setting a printing target range for each color.

Next in the multi-color printing control, the process control for setting the printing range of each color is executed in step S13 as shown in FIG. 19.

When this control begins, the color number N is set in a color number counter as a count value I (S33). Then, the color number count value I is decremented by one and if the result is not zero, that is, if the character array is not the final target character array of the final color (S34:No), then the process for setting the printing target character array is executed in S35 to set the character array with to be printed in the subsequent yet unset color in the color sequence data. This setting is performed by indicating, with cursor, those characters, symbols and the like constituting the target character array to be printed in the subsequent color.

That is, during this process for setting the printing target character array, the text data is displayed on the display 5. By operating the four cursor movement keys provided on the right side of the keyboard 4, for each printing color except for the last printing color, each character, symbol, and the like in the printing target array is indicated with the cursor with respect to its corresponding printing color. Each time the character-color setting is made by the cursor, a color set key is pressed. After completing setting of the printing target character arrays, a set key is pressed. By pressing this set key, the set color data is appended to the character data of the characters indicated by operating the cursor movement keys and pressing the color set key, and this data is stored in the text memory 121.

Then, the color number count value I is decremented by one (S36), and steps S34 through S36 are repeated until (I−1) equals zero. When (I−1) equals zero, that is, when all printing target character arrays have been set with respect to all of the printing colors except the last color (S34:Yes), a process is executed in S37 in order to set the remaining characters and symbols in the text data, as yet unset with a printing color, to the last printing color.

Figure 20:
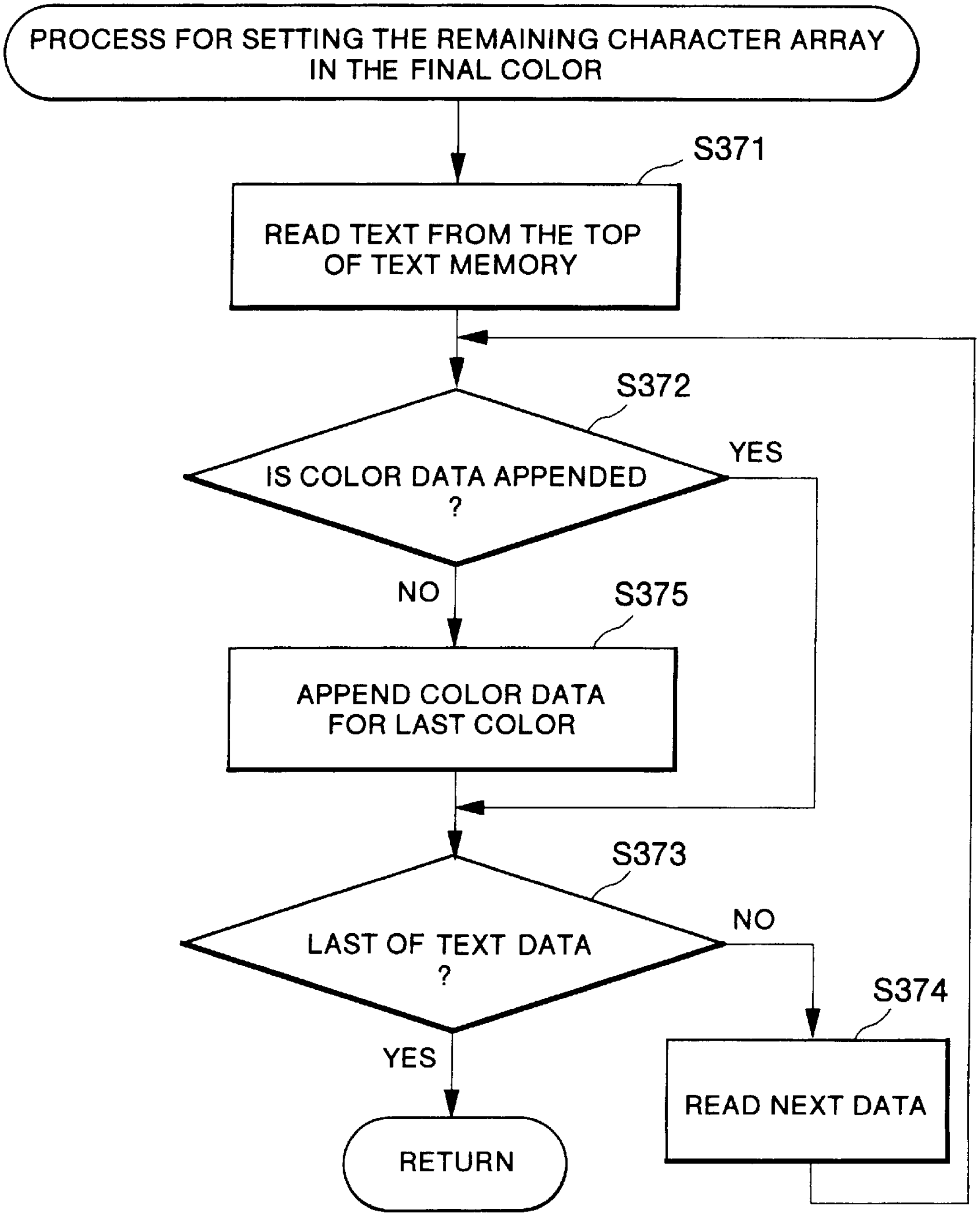
FIG. 20 is a flowchart representing a process control for setting the final printing color with respect to the remaining character array.

Next, the process for setting the remaining character arrays to the final printing color will be described in detail with reference to FIG. 20. First, the character data stored in the text memory 121 is read from the top of the memory (S371). The data is checked to see if color data is appended or not (S372). If color data is appended to the character data read (S372:Yes) and that character data is not the last of the character data (S373: No), then the next data is read (S374), and the process is repeated from S372. However, if color data is not appended to the character data read (S372: No), color data corresponding to the final printing color is appended to that character data and stored (S375), and the process at S373 is executed. All of the above-mentioned processes are repeated until the end of the character data stored in the text memory 121. When the data is found at S373 to be the last of the character data (S373:Yes), then control is returned to S38 of FIG. 19.

Provided that the character data "AB CDE "FG" is stored in the text memory 121, the color number is set to "3," and the color sequence is set to "red," "green," and "black". during the process for setting the printing target character array in S35, first the character array "AB" is set for the printing color red by operating the cursor keys and the color set key. As shown in FIG. 27, the color data "red" is appended to the character data "A" and "B" of the text memory 121, and each combination of character data and color data is stored. Next, the character array "CDE" is set for the printing color "green," and the color data "green" is appended to the character data "C," "D" "E" of the text memory 121, and stored.

When setting of the printing color "green" is completed, the color number count value I will be greater than zero (I−1=0). Therefore, in the process for setting the character array in S37, the character data of the text memory 121 is read in order, beginning from the top of the memory. The character array "FG" of the text data, which has not yet been set with a printing color, is automatically set to the final printing color, "black," and the printing data "black" is then saved in the text memory 121, appended to the character data "F" and "G".

Next, the message "Margin for the printing tape.?" is displayed on the display 5. The margins are set to the desirable size by operating the number keys, and the margin set is stored in the margin memory 124 (S38). Control is then returned to S14 for continuing the multi-color printing control.

Figure 21:
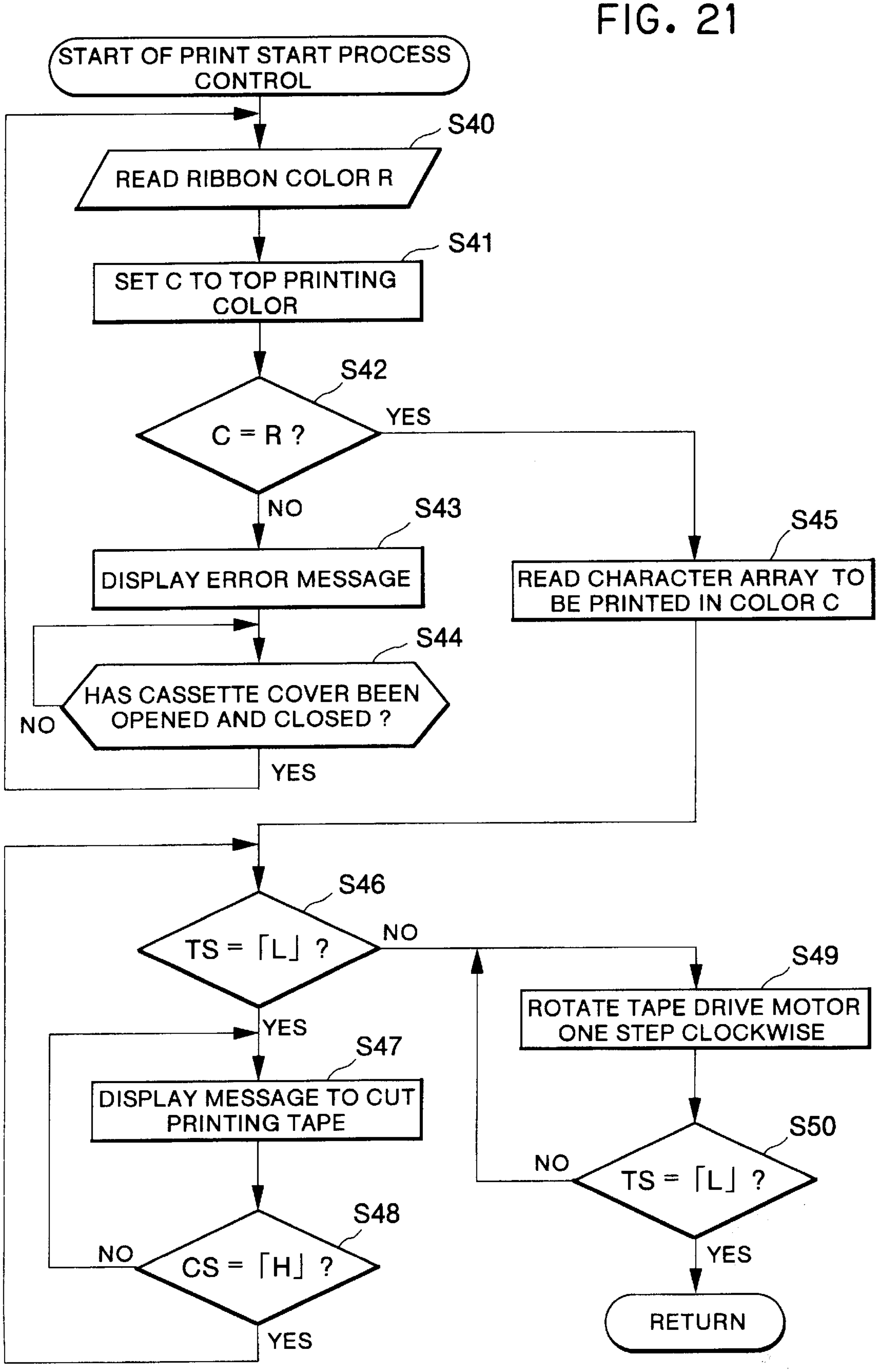
FIG. 21 is a flowchart representing a print start process control routine.
Figure 22:
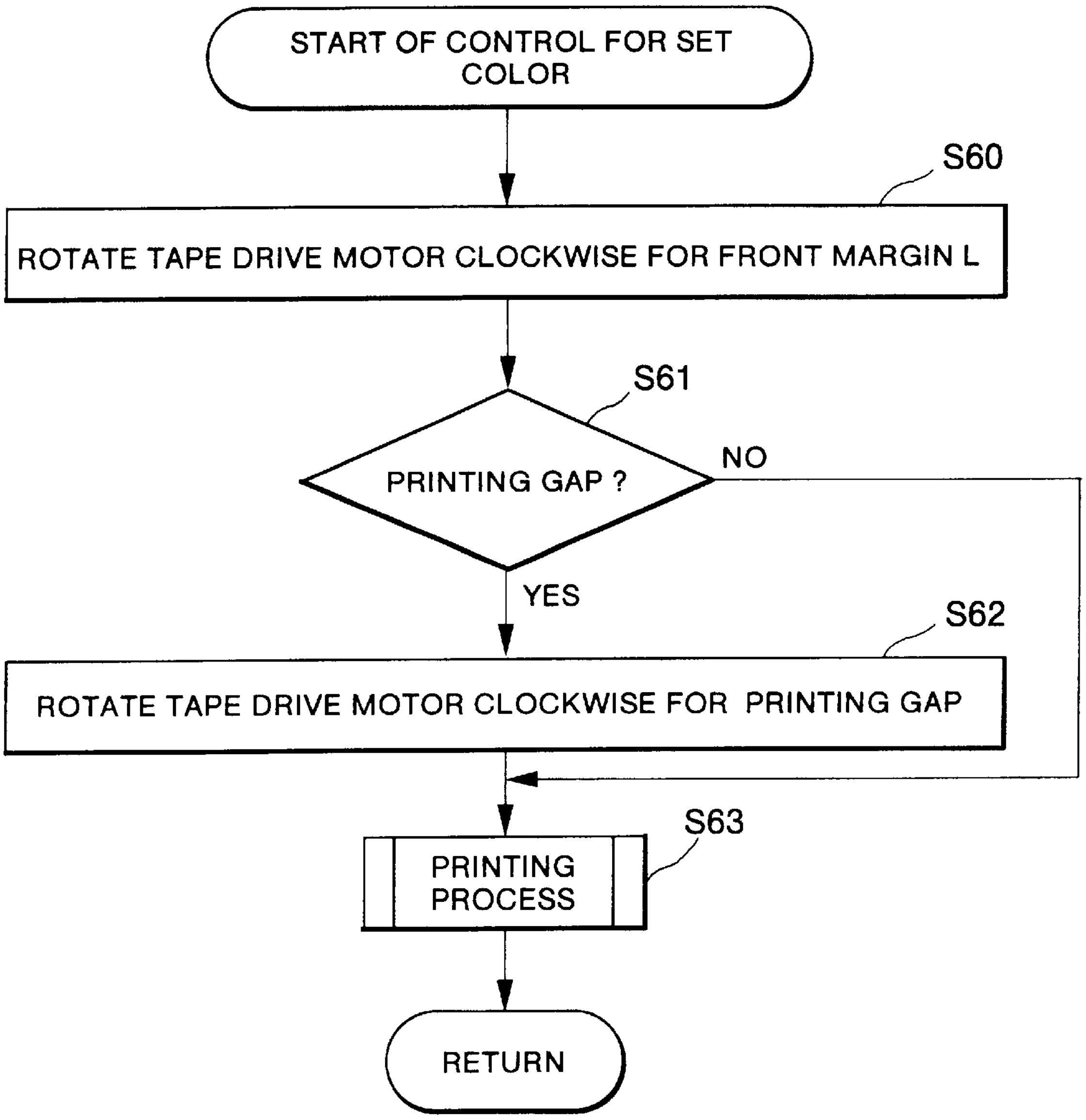
FIG. 22 is a flowchart representing a process for setting the color.

When the printing key is pressed in the multi-color printing control (S14:Yes, S15:Yes), the printing start process control (S16) is executed, as shown in FIG. 21.

When this process begins, first, the ribbon color R of the mounted ribbon cassette 30 is read (S40), based on ribbon detection signals RS from the group of ribbon detection switches 103. Then, the leading printing color C in the printing color sequence is read (S41). If the ribbon color R does not match the leading printing color C (S42: No), then an error message is displayed on the display 5 (S43) indicating that the ribbon color does not match the printing color.

After the cassette cover 3 is opened, the ribbon cassette 30 is replaced, and the cassette cover 3 is closed again, according to the cover open and close signals VS transmitted from the cover open and close detection switch 102, steps S40 and S41 are repeated. Then, if the ribbon color R matches the leading printing color C (S42:Yes), the stored character array appended with data of the leading printing color C is read from the text memory 121. Further, the dot pattern data of that character array is developed in the printing data buffer 125 (S45).

Then, the tape detection signal TS is read from the tape detection sensor 91. If the tape detection signal TS is "L" level, meaning the printing tape 22 is positioned corresponding to the tape detection sensor 91 (S46:Yes), then a message prompting the user to cut the printing tape is displayed on the display 5 (S47).

Next, the cutting button 85 is pressed for cutting the printing tape 22, and the cut detection signal CS from the cut detection switch 101 becomes "H" level (S48:Yes). Then, the tape detection signal TS becomes "H" level, meaning the tape cutting was detected (S46:No), the tape drive motor 44 is driven one step only in the clockwise direction, and the printing tape 22 is moved a very small distance in the feeding direction T, in order for the leading edge of the tape to penetrate the tape detection sensor 91 (S49). As far as the tape detection signal TS maintains "H" level, steps S49 and S50 are repeated.

Figure 28A:
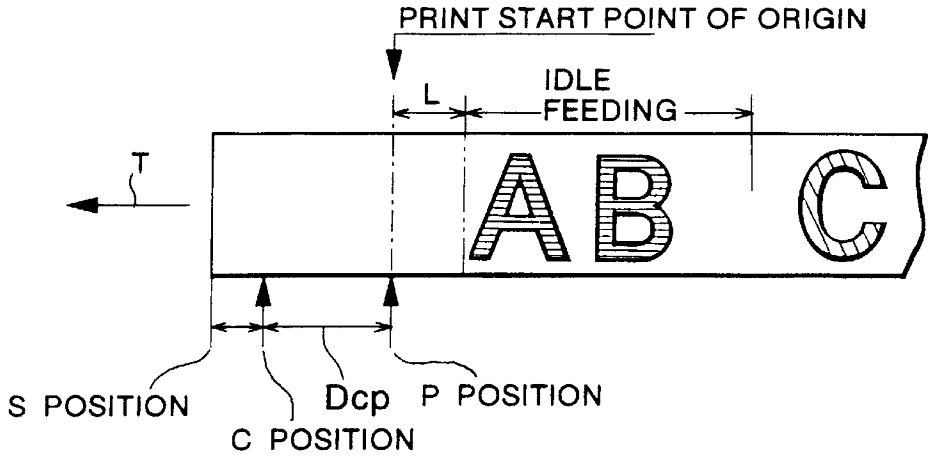
FIG. 28(*a*) is an explanatory diagram showing a print start point of origin on a tape.
Figure 28B:
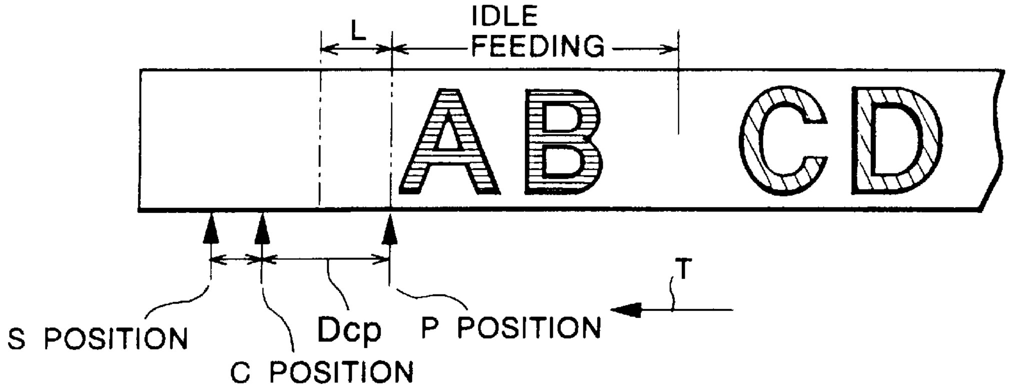
Figure 28C:
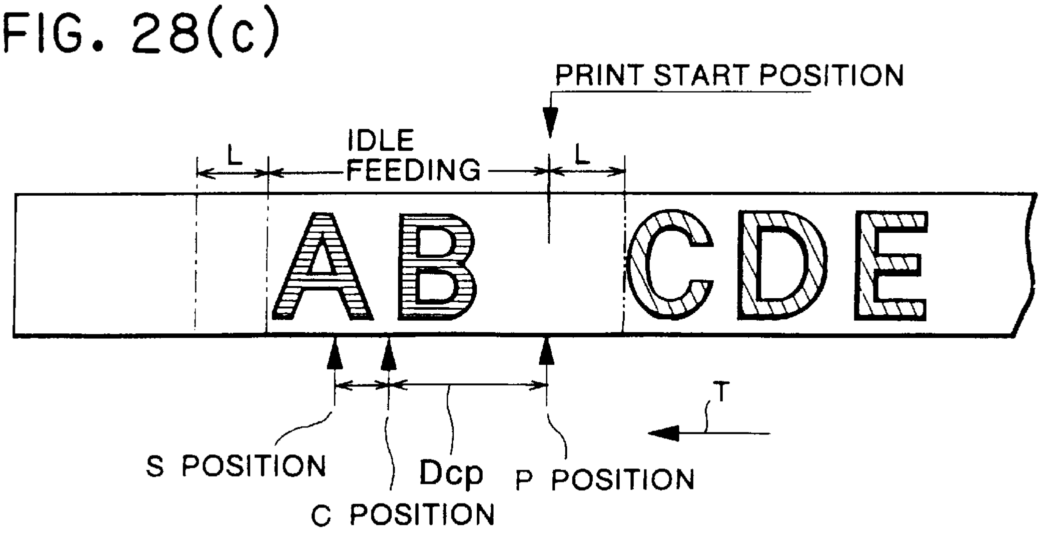

When the tape detection signal TS becomes "L" level, as shown in FIG. 28(*a*) signifying that the leading edge of the printing tape 22 has penetrated the tape detection sensor 91 (S50:Yes), control is returned to S17 of the multi-color printing control. At this time, the printing position of printing tape 22, which corresponds to the thermal head 12 when the leading edge of the tape was detected is set as the print start point of origin. When moving the printing tape 22 in the feeding direction T, even if the leading edge of the printing tape is curled, the leading edge of the printing tape can be reliably guided through the slit 98 by means of the guides 99 formed on the pair of guide members 94 and 95.

Next, in S17 of the multi-color printing control, when the color number N is not "1", that is, when the printing process is not on the last color (S17: No), the process shown in FIG. 22 for setting the color (S18) is executed to print the selected printing color.

As shown in FIG. 28(*b*), when this control begins, first, the tape drive motor 44 is driven in the clockwise direction to move the printing tape the first margin amount L, which corresponds to the set margin L (S60).

Then, if the printing start position of characters to be printed in the current printing color is upstream in the feeding direction T from the print start point of origin (S61:Yes), for example, as shown in FIG. 28(*c*), if idle feeding (or feeding without printing) is required to print the characters "CDE" in the printing color "green," the tape drive motor 44 is driven in the clockwise direction, moving the printing tape 22 in the feeding direction T only the amount of the required idle feeding (S62).

However, when no idle feeding of the tape is required (S62: No), the routine skips to S63 without executing S62. The dot pattern data developed in the printing data buffer 125 is read, and a printing process is executed for the dot pattern data by driving the thermal head 12, the tape drive motor 44, and the like for printing (S63).

After this printing process is finished, control is then returned to S19 of the multi-color printing control.

Figure 23:
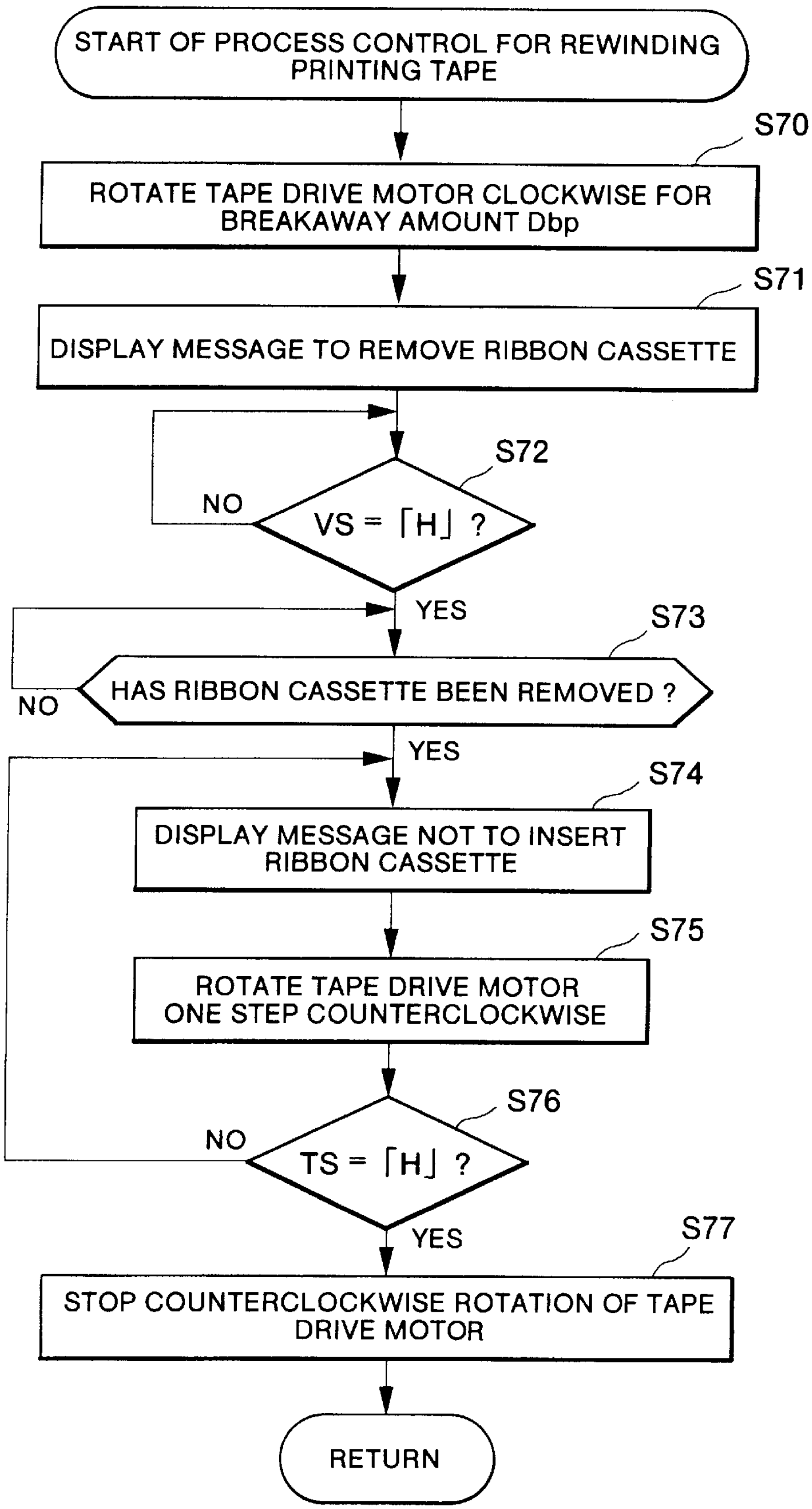
FIG. 23 is a flowchart representing a printing tape rewinding process control.

Next, in the multi-color printing control, the printing tape rewinding process control (S19) is executed as shown in FIG. 23.

When this control is started, first, the tape driving motor 44 is driven in the clockwise direction, moving both the printing tape 22 and the ink ribbon 32 in the feeding direction T for only the separation feeding distance Dbp, which corresponds to the distance Dbp between the printing position (P position) and the separation position (B position) (S70).

This feeding is required because the ink of the ink ribbon 32 is fused or melted to the printing tape 22 by the thermal head 12 at the final printing position. However, because the printing tape 22 and the ink ribbon 32 are moved for only the separation feeding distance Dbp, the ink ribbon 32 is forcibly pulled away from the printing tape by the separation portion 35*a*. Thus, the printing tape 22 and the ink ribbon 32 are separated with certainty.

Then, so that the user replaces the ribbon cassette 30 with one that has an ink ribbon 32 of the same color as the next printing color, a message prompting the user to remove the ribbon cassette 30 is displayed on the display 5 (S71). Then, when the cassette cover 3 is opened, the operation plate 74 is moved in the rearward direction, and an "H" level cover open and close signal VS is output from the cover open and close detection switch 102 (S72:Yes), and also all six of the detection switch signals become "H" level signals, as the ribbon detection signal RS from the group of ribbon detection switches 103, which signifies that the ribbon cassette 30 has been removed (S73:Yes), a message prompting the user not to insert another ribbon cassette 30 is displayed on the display 5 (S74).

Next, to rewind the printing tape 22, the tape drive motor 44 is driven one step only in the counterclockwise direction, moving the printing tape 22 a very slight distance in the rewind direction (S75). During this rewinding operation, if the tape detection signal TS is "L" level (S76: No), steps S74 through S76 are repeated. Then, if the leading edge of the printing tape 22 is rewound until it is slightly to the inner side of the tape detection sensor 91, the counterclockwise rotation of the tape drive motor 44 is stopped (S77). Control is then returned to S20 of the multi-color printing control.

Figure 24:
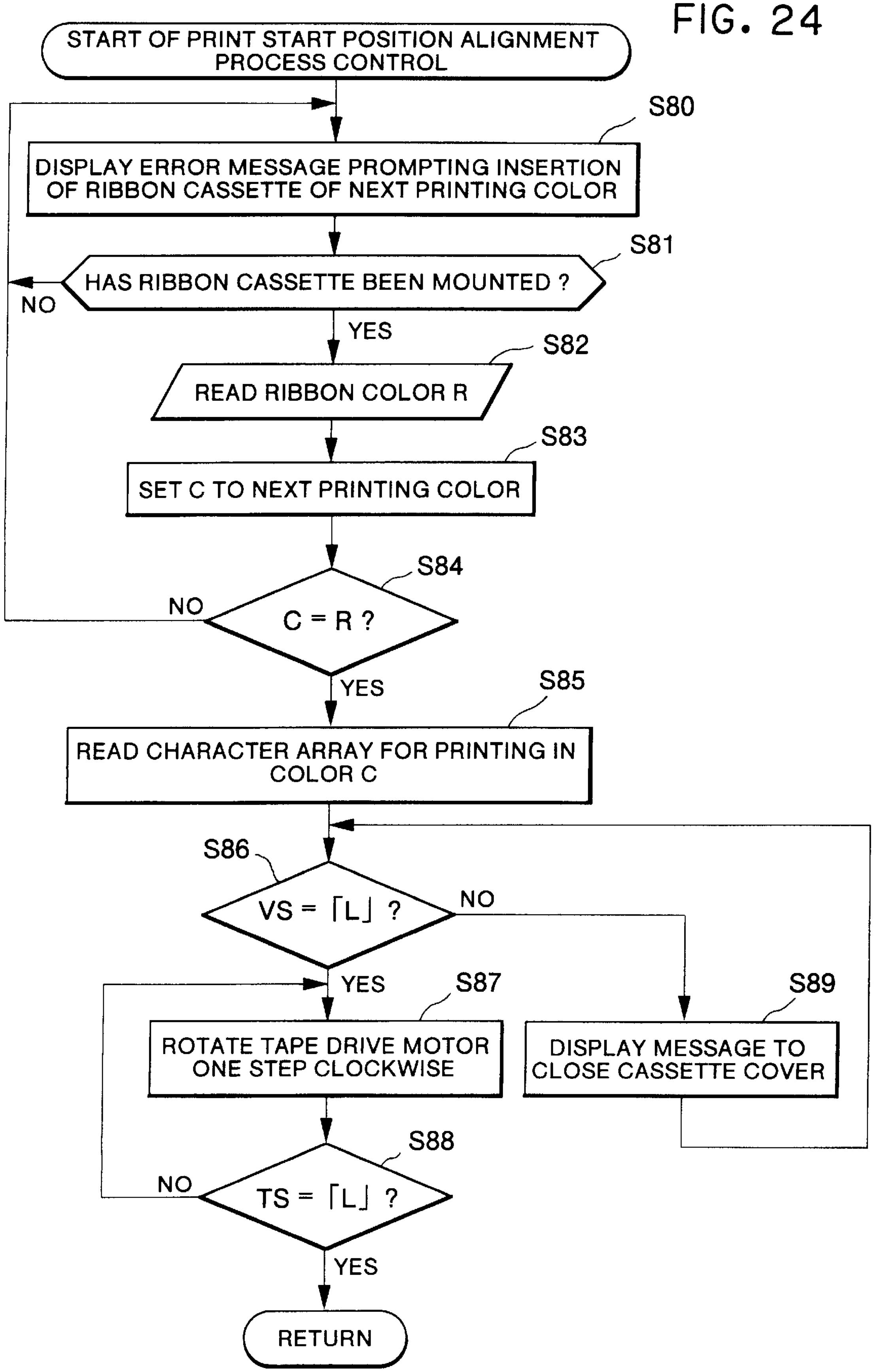
FIG. 24 is a flowchart representing a print start position alignment process control.

Next, in the multi-color printing control the printing start position alignment process control (S20) is executed, as shown in FIG. 24.

When this control is begun, first, an error message prompting the user to insert a ribbon cassette 30 having an ink ribbon 32 of the same color as the next printing color is displayed on the display 5 (S80). Then, if any of the six switch signals making up the ribbon detection signal RS is at the "L" level, signifying that the ribbon cassette 30 is mounted (S81:Yes), then the ribbon color R of the mounted ribbon cassette 30 is read based on the ribbon detection signals RS (S82). Then, the next printing color C of the printing color sequence is read (S83). If the ribbon color R does not match the next printing color C (S84: No), then steps S80 through S84 are repeated.

When the ribbon color R matches the next printing color C (S84:Yes), the stored character array appended with the data for the next printing color C is read from the text memory 121. Further, dot pattern data for that character array is developed in the printing data buffer 125 (S85).

When the cassette cover 3 is not closed (S86: No), a message prompting the user to close the cassette cover 3 is displayed on the display 5 (S89). When the cassette cover 3 has been closed (S86:Yes), the tape drive motor 44 is driven one step only in the clockwise direction, until the leading edge of the printing tape 22 reaches the tape detection sensor 91 (S87 and S88: No). If the tape detection signal TS becomes "L" level, signifying that the leading edge of the printing tape 22 has reached the tape detection sensor 91, the print start point of origin for the printing tape 22 is positioned at the print position of the thermal head 12 (S88:Yes). Control is then returned to S21 of the multi-color printing control.

Figure 25:
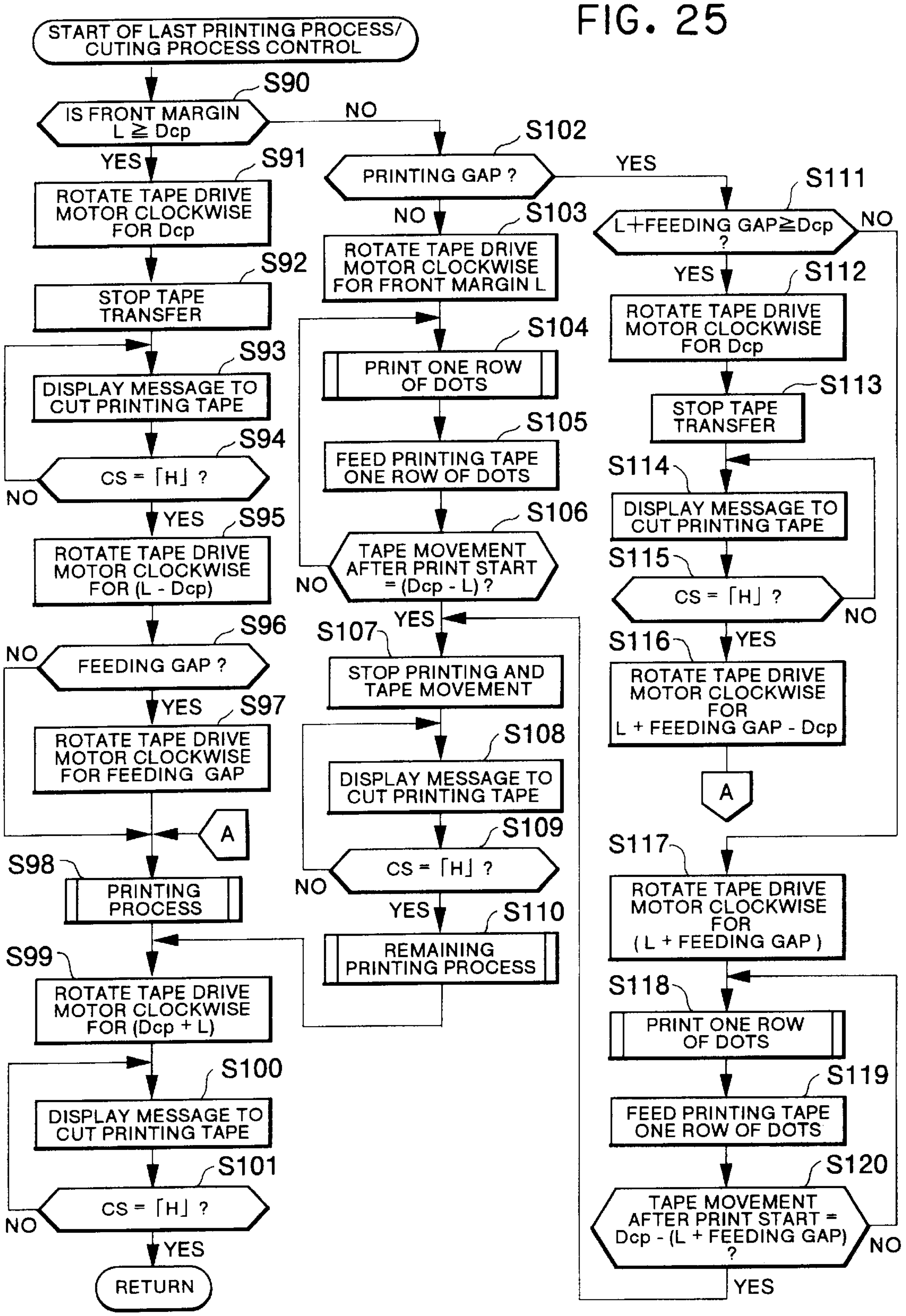
FIG. 25 is a flowchart representing a final color printing process and a cutting process control.

Next, in the multi-color printing control, the color number N is decremented by one (S21). If the color number is not "1," or not the final printing color (S17: No), steps S18 through S21 are repeated. If the color number N becomes "1," or the final printing color (S17:Yes), the final color printing process and cutting process control (S22) will be executed as shown in FIG. 25.

This control is separated into four possible situations: Case 1 through 4. In Case 1, the front margin L is greater than or equal to the distance Dcp between cutting and printing positions. In Case 2, the front margin L is smaller than the Dcp, and no idle feeding is required. In Case 3, the front margin L is smaller than the Dcp, idle feeding is required, and further, the total length of the front margin L and the idle feeding is equal to or greater than the distance Dcp between the printing position and the cutting position. In Case 4, the front margin L is smaller than the Dcp, idle feeding is required, and further, the total length of the front margin L and the idle feeding is smaller than the distance Dcp between the printing position and the cutting position.

First, Case 1 will be described. When the front margin L is greater than the Dcp (S90:Yes), the printing tape 22 is moved only the distance Dcp in the feeding direction T by the tape drive motor 44 being driven in the clockwise direction (S91). Then, the drive of the tape drive motor 44 is stopped, stopping the tape movement (S92). Next, the tape drive motor 44 is rotated a little in the rewinding direction. When, as shown in FIG. 15, the end portion of the cut prevention lever 84 is removed from beneath the cutting lever 82, making the cutting operation possible, then a message prompting the user to cut the printing tape 22 is displayed on the display 5 (S93). Then, when the printing tape 22 is cut and the cutting detection signal CS becomes the "H" level, signifying the tape cutting has been detected (S94:Yes), the printing tape 22 is moved in the feeding direction T by the remaining distance of the front margin L (front margin L−Dcp) (S95).

If the print start position of the last printing color is upstream from the print start point of origin in the feeding direction T, so that an idle feeding is required (S96:Yes), the tape drive motor 44 is driven in the clockwise direction, moving the printing tape 22 in the feeding direction T by the length of the idle feeding (S97).

Then, the characters, symbols, and the like, based on the dot image data read similar to S63 described earlier, are printed in the final printing color (S98). Next, in order to provide the rear margin L behind the printed character array, the tape drive motor 44 is driven in the clockwise direction, moving the printing tape 22 in the feeding direction T by the distance Dcp plus the rear margin L (S99). Then, the tape drive motor 44 is rotated slightly in the rewinding direction. When the end portion of the cut prevention lever 84 is removed from beneath the cutting lever 82, making the cutting operation possible, a message prompting the user to cut the printing tape 22 is displayed on the display 5 (S100).

Then, when the printing tape 22 is cut and the cutting detection signal CS becomes the "H" level, signifying the tape cutting has been detected (S101:Yes), control is returned to S10 of the multi-color printing control.

Next, Case 2 will be described. When the front margin L is less than the distance Dcp and no idle feeding is required (S90 and S102: No), the tape drive motor 44 is driven in the clockwise direction, moving the printing tape 22 in the feeding direction T by the distance of the front margin L (S103). Then, the final printing process and cutting of the printing tape 22 is performed according to the steps beginning at S104.

More specifically, one row of the dot pattern data is read from the printing data buffer 125 and printing is performed with the one row of the dot pattern (S104). The tape drive motor 44 is driven in the clockwise direction, moving the printing tape 22 only by the short distance corresponding to the one row of dots (S105). If the amount of tape movement after the final printing has begun is less than the distance of the front margin L subtracted from the distance Dcp, that is, if the top position of the front margin has not yet reached the cutting position (C position) (S106:No), then steps S104 through S106 are repeated.

When the top position of the front margin L has reached the cutting position (S106:Yes), the printing and tape movement are stopped (S107). Then, the tape drive motor 44 is rotated slightly in the rewinding direction. When the end portion of the cut prevention lever 84 is removed from beneath the cutting lever 82, making the cutting operation possible, a message prompting the user to cut the printing tape 22 is displayed on the display 5 (S108).

Then, when the cutting button 85 is pressed, the printing tape 22 is cut, and the cutting detection signal CS becomes the "H" level, signifying the tape cutting has been detected (S109:Yes), printing of the remaining dot pattern data to be printed is carried out (S110). The rear margin L is provided according to steps S99 through S101, and the tape is cut, and control is returned to S10.

Next, Case 3 will be described. When the front margin L is smaller than the distance Dcp between the printing position and the cutting position, an idle feeding is required, and the total length of this idle feeding and to the front margin L is greater than the distance Dcp (S90: No: S102 and S111:Yes), the tape is moved as in the previously described steps S91 through S94, and the tape is cut (S112 through S115). Further, the printing tape 22 is moved in the feeding direction T by the distance (front margin L+idle feeding−Dcp) (S116). Then, the steps beginning from S98 are executed, so that printing in the final color is performed, and the rear margin L is provided, and the tape is cut. Control is then returned to S10.

Finally, Case 4 will be described. When the front margin L is smaller than the distance Dcp, an feeding is required, and the value of this idle feeding added to the front margin L is less than the distance Dcp (S90: No; S102:Yes; S111: No), the printing tape 22 is moved in the feeding direction T by the distance of the total length of the front margin L and the idle feeding (S117). Then one row of the dot pattern data is read from the printing data buffer 125 and printing is performed (S118). The tape drive motor 44 is driven in the clockwise direction, moving the printing tape 22 only by the short distance corresponding to the one row of dots (S119).

When the amount of tape movement after the final printing has begun is less than the difference between the distance Dcp and the total length of the front margin L and the idle feeding length, that is the top position of the front margin L has not yet reached the cutting position, (S120: No), then steps S118 through S120 are repeated.

Figure 29:
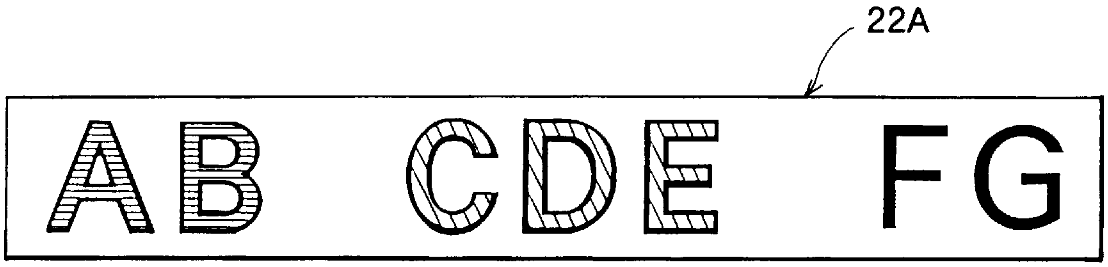
FIG. 29 is a plan view showing the tape-shaped label printed in three colors.

When the top position of the front margin L has reached the cutting position (S120:Yes), the steps beginning from S107 are executed. Both the front margin L and the rear margin L are provided, and the tape is cut. Control is then returned to S10. As in the example of the input text "AB CDE FG" shown in FIG. 29, a label was obtained with the front and rear margins L provided, the character array "AB" printed in the color red, the character array "CDE" printed in the color green, and the character array "FG" printed in the color black.

Next, the operations of the multi-color printing process will be described. After text is input, a process for setting a number N of colors and a color order for print colors is executed. Further, a process for setting a print target range for each color to be printed in a plurality of colors is executed. After a ribbon cassette 30 with a ribbon color R that is the same as the first print color C is mounted, a print process is executed by controlling drive of a thermal head 12 and a tape drive motor 44. Each time a print process is completed in S63, but before the message to remove the tape 22 is displayed in S71, the tape drive motor 44 is driven to rotate in the clockwise direction in S70 so as to transport the print tape 22 and the ink ribbon 33 in the feed direction T by a separation feed amount Dbp, which corresponds to the distance Dbp between the print position (P position) and the separation position (B position). Then, feed of the print tape 22 and the ink ribbon 32 is stopped. Therefore, after the ink ribbon is fed an amount necessary for printing, feed of the ink ribbon 32 is stopped so that wasteful feeding of the ink ribbon 32 is prevented.

As mentioned previously, ink of the ink ribbon 32 is melted and clings to the print tape 22 at a maximum downstream edge of the print region printed by the thermal head 12. Because the print tape 22 and the ink ribbon 32 are transported by the separation feed amount Dbp, the ink ribbon 32 is forcefully peeled away from the print tape 22 by the separation portion 35*a*. Therefore, the print tape 22 and the ink ribbon 32 can be accurately separated. Afterward, the print tape 22 will not be drawn out from the tape cassette 20 when the ribbon cassette 30 is removed from the tape cassette 20.

In this way, each time a print process for a set range is completed, feed of the tape and the ink ribbon by the ribbon/tape transport mechanism 40 is stopped so that wasteful feeding of ink ribbon is prevented.

When feeding of the ink ribbon and tape is stopped, the feeding of the print tape 22 is stopped when the maximum downstream edge of the printing target region most recently printed on the print tape 22 has passed the separation member 35. When tape feed is stopped, the maximum downstream edge of the print region of the print tape 22 has passed the separation portion 35*a* of the separation member 35 so that the ink ribbon 32 is accurately separated from the print tape 22 by the separation portion 35*a*. As a result, the print tape 22 can be reliably prevented from being drawn out of the tape cassette 20 when the ribbon cassette 30 is removed from the tape cassette 20 upon completion of print processes.

Because the position where the print tape 22 is stopped is determined based on a predetermined value, which is preset taking the distance from the thermal head 12 to the separation portion 35*a* of the separation member 35 into account, even if the distance from the thermal head 12 to the separation portion 35*a* differs, for example, for each type of tape printer, when feed of the tape is stopped in association with completion of printing operations, the ink ribbon will be reliably separated from the print tape 22 by the separation member 35. Further, because the separation member 35 has a separation portion 35*a* that bends the ink ribbon 32 to an acute angle at the mid-way portion along the ribbon transport pathway, the ink ribbon 32 can be effectively separated from the print tape 22 without the separation member 35 adversary affecting transport of the print tape 22.

Figure 30:
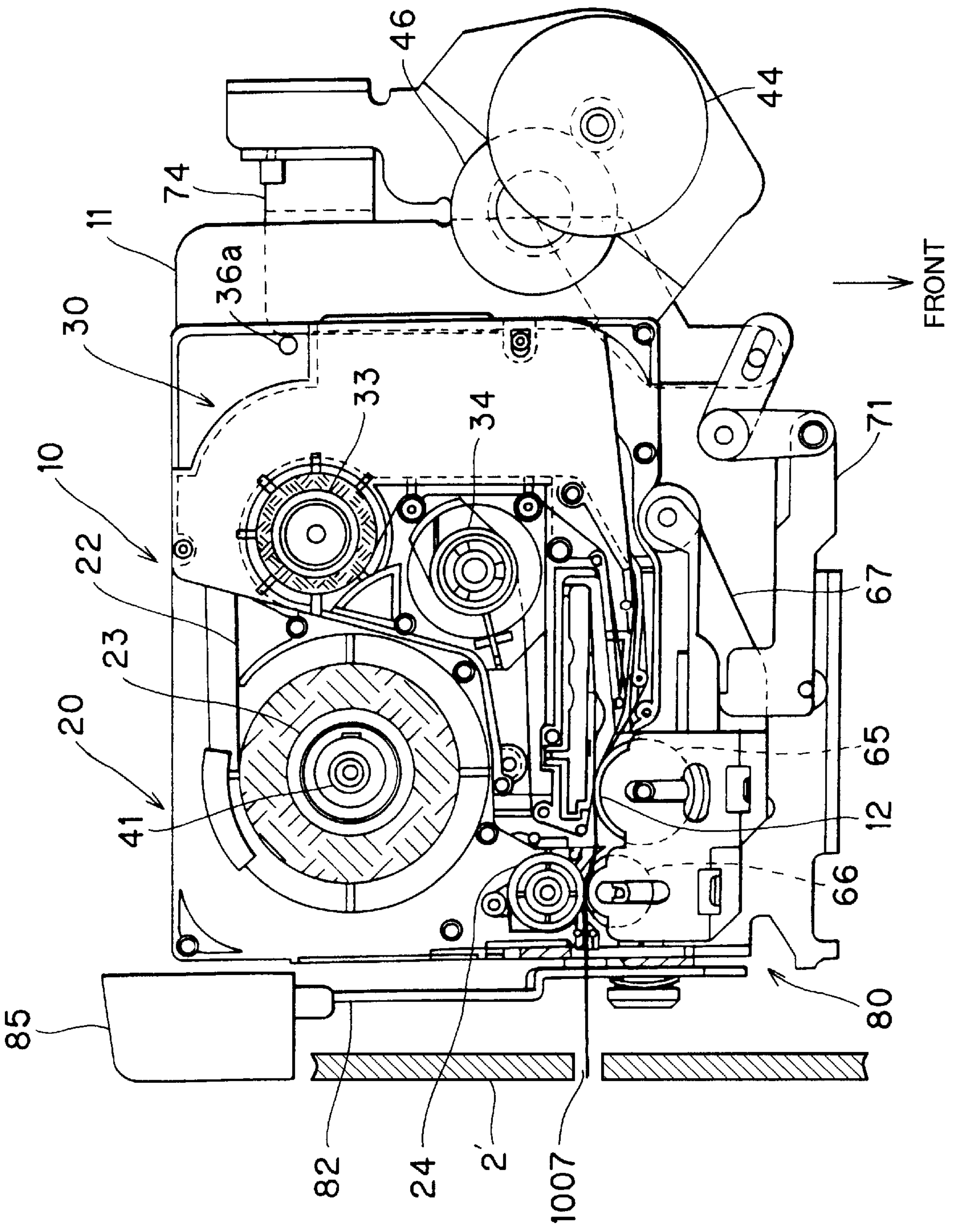
FIG. 30 is a plan view showing a thermal printing mechanism of a tape-shaped label printing device of a second embodiment in the printing state.
Figure 31:
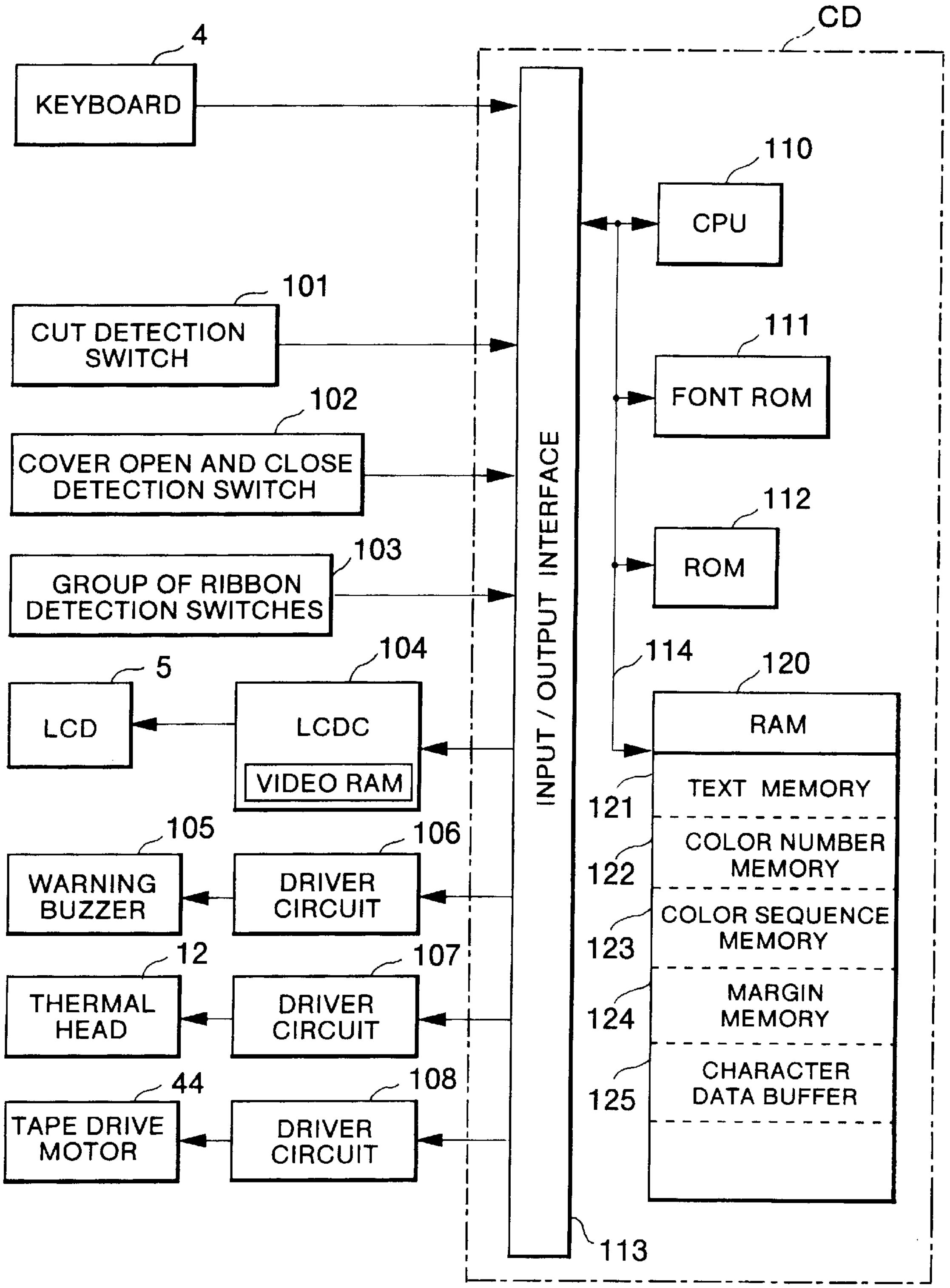
FIG. 31 is a block diagram showing a control system of the tape-shaped label printing device.

Next, an explanation will be provided for a label printing device 1' according to a second embodiment of the present invention. As shown in FIGS. 30 and 31, the label printing device of the second embodiment has a configuration similar to that of the first embodiment, except that the tape detection sensor 91 has been dispensed with. As a result, the main cover 2' is not provided with the sensor accommodating chambers 96 and 97 and other related configuration.

Instead, a discharge port 1007 for discharging the printed print tape 22 out of the tape-shaped label printing device 1' is formed to the leftside surface of the main cover 2' in between the cutting knob 85 and the keyboard 4. The S position defined by the tape detection sensor 91 in the first embodiment is defined by the tape discharge port 1007 in the second embodiment. As a result, the distance Dsc is about 10 mm rather than the 15 mm distance described in the first embodiment.

Also, the print tape 22 is manually rewound rather than rewound by driving the tape drive motor 44 in the counterclockwise direction. As shown in FIG. 7, a grip 23*a* for rewinding the print tape 22 is formed to the upper surface of the tape spool 23. The user grasps the grip 23*a* and rotates the tape spool 23 in the counterclockwise direction as viewed in FIG. 7 and can thereby rewind the print tape 22.

Figure 32:
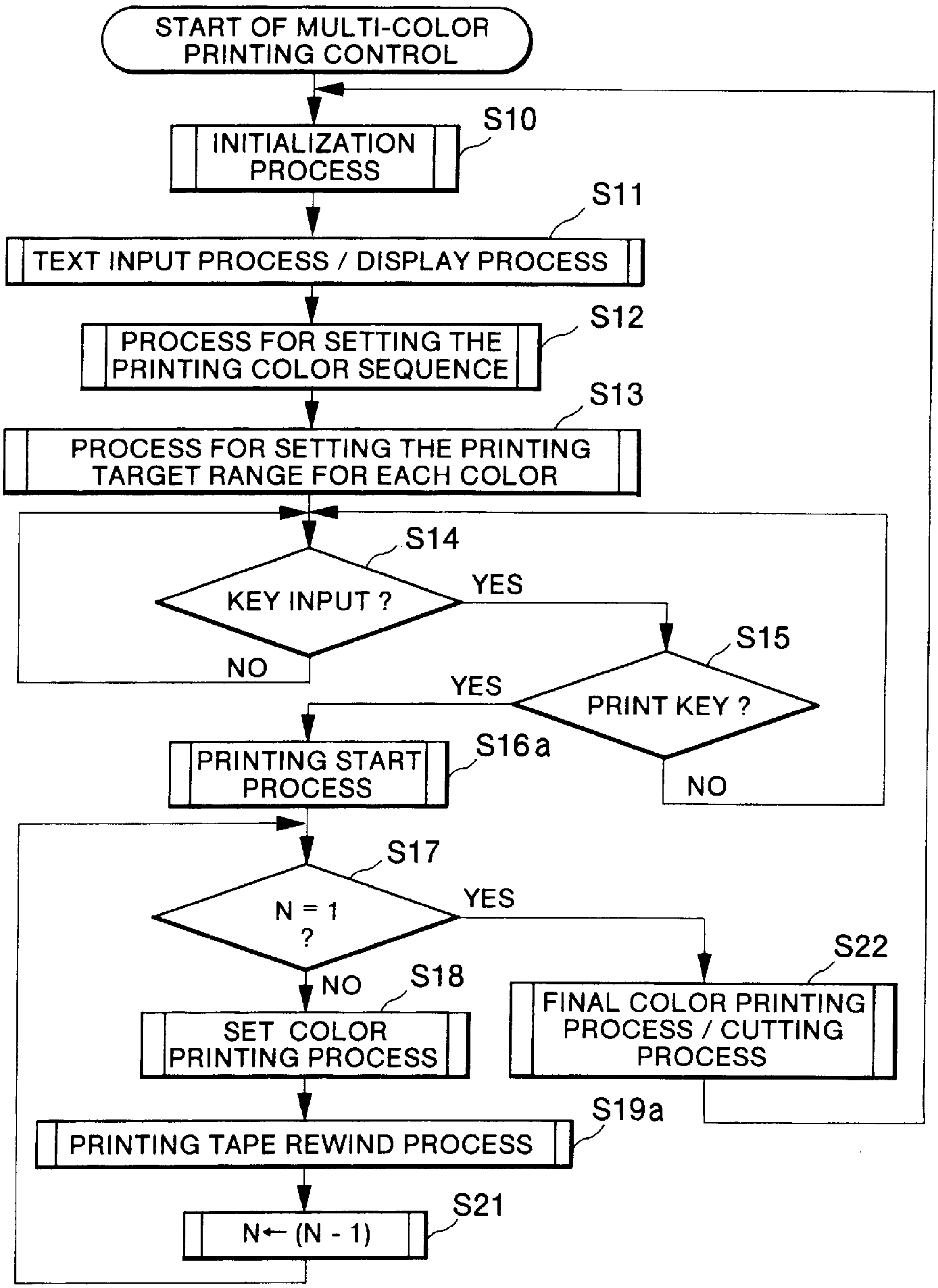
FIG. 32 is a general flowchart representing a multi-color printing control routine according to the second embodiment.

Next, an explanation will be provided for control processes for the label printing device 1'. Processes for the label printing device 1' are similar to those of the label printing device 1 of the first embodiment. However, as shown in FIG. 32, the printing start process of S16 is replaced with a printing start process in S16*a*, shown in detail in FIG. 33. Also, the printing tape rewind process of S19 is replaced with a printing tape rewind process in S19*a* shown in detail in FIG. 34. Additionally, the print start position alignment process of S20 is eliminated from the multi-color printing control. However, a portion of the print start position alignment process is performed in the printing tape rewind process of S19*a*.

Figure 33:
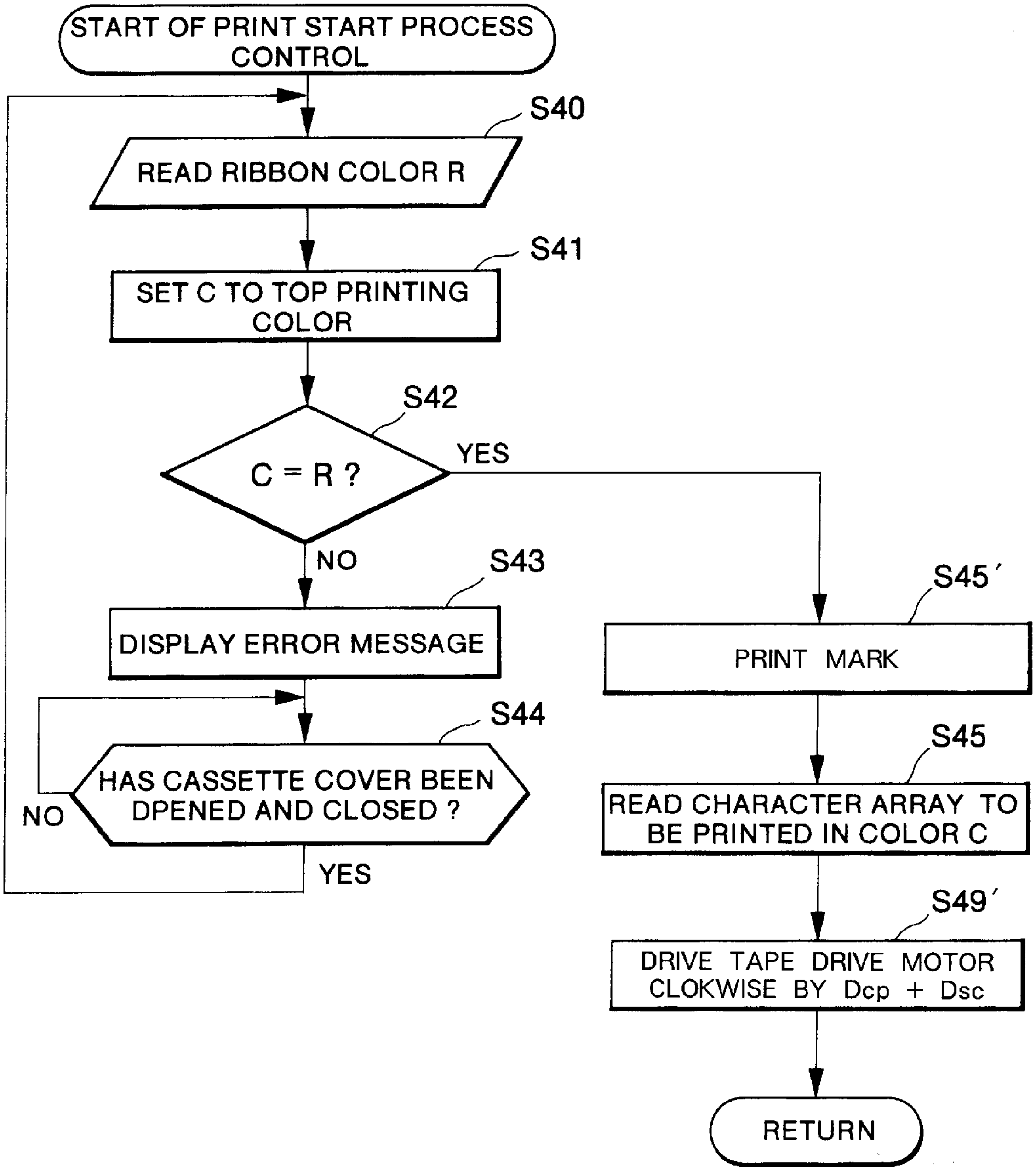
FIG. 33 is a flowchart representing a print start process control routine according to the second embodiment.
Figure 35A:
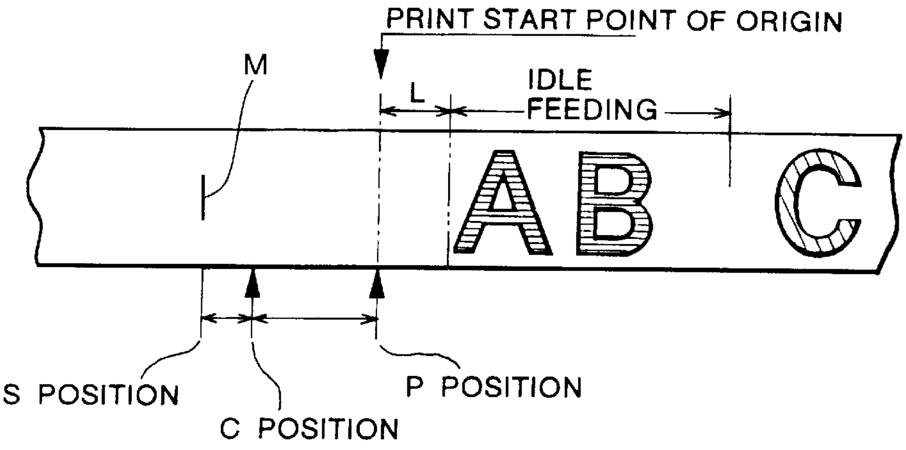
FIG. 35(*a*) is an explanatory diagram showing a print start point of origin on a tape and a mark printed according to the second embodiment.
Figure 35B:
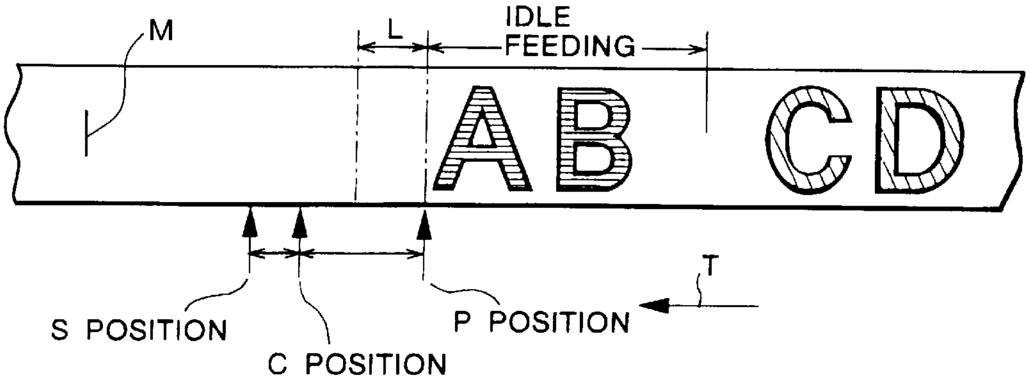
Figure 35C:
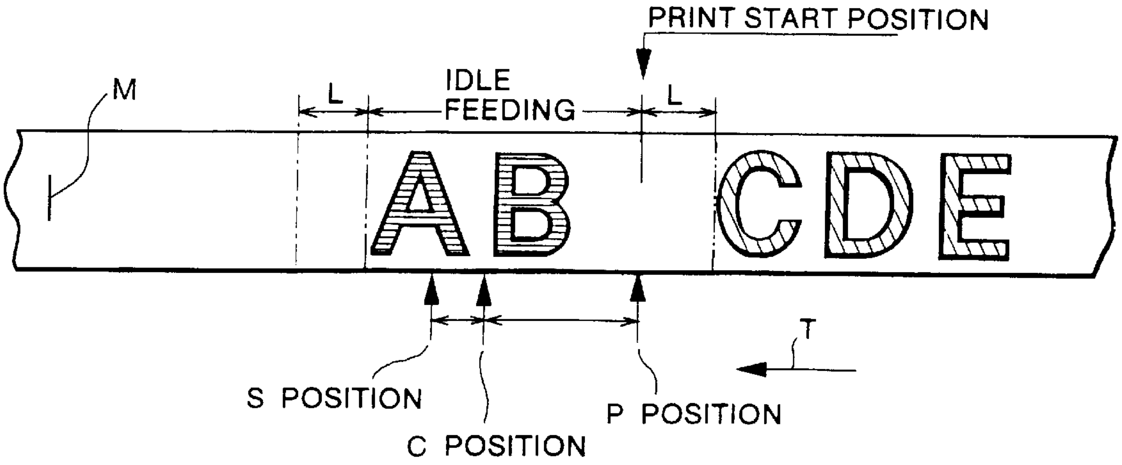

Here, the print start process of S16*a* will be described while referring to the flowchart of FIG. 33. After it is determined in S42 that the ribbon color R matches the leading printing color C (S42: Yes), a mark M used to position the print tape 22 when rewinding the printed print tape 22 is printed in S45'. The mark M is formed on the print tape 22 by printing a vertical line as shown in FIGS. 35(*a*) through 35(*c*).

After S45, wherein the stored character array appended with data of the leading printing color C is read from the text memory 121 and dot pattern data of that character array is developed in the printing data buffer 125, then in S49' the tape drive motor 44 is driven to rotate clockwise to feed the print tape 22 a distance equal to the sum of the print cut interval distance Dcp, between the print position and the tape cutting position, added to the cut discharge port interval distance Dsc, between the tape cutting position and the tape discharge port 1007. By feeding the tape in this manner, the mark M printed in S45' is transported to the position of the tape discharge port 1007, that is, to the S position as shown in FIG. 35(*a*). The program then returns to S17.

It should be noted that in the present embodiment, printing position is determined in S61 and S96 with respect to the position the thermal head 12 is currently confronting, rather than to the print start point of origin.

Figure 34:
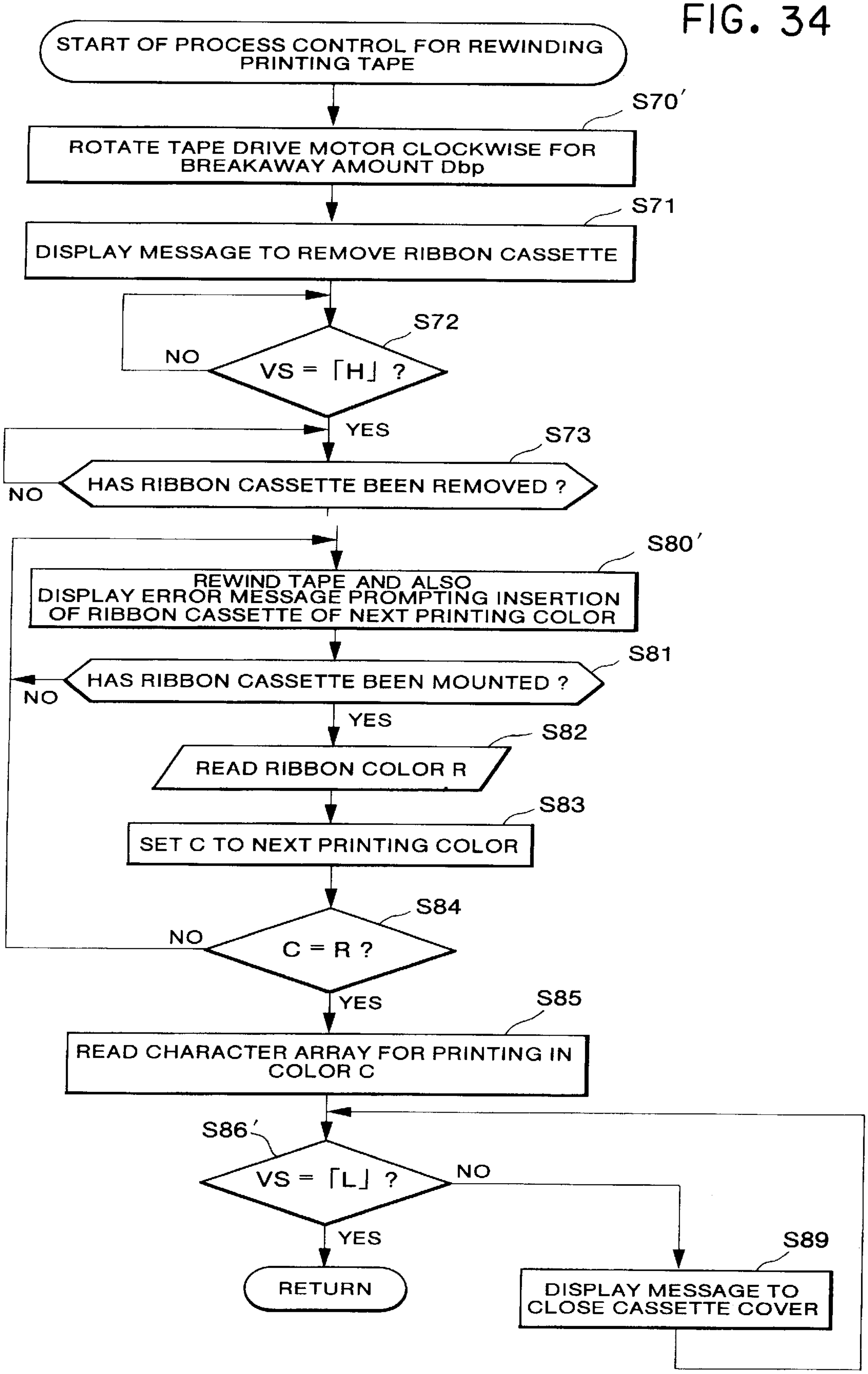
FIG. 34 is a flowchart representing a printing tape rewinding process control according to the second embodiment.

Next, the printing tape rewind process in S19*a* will be described while referring to the flowchart of FIG. 34. When this routine starts, first, in S70 the tape drive motor 44 is driven to rotate in a positive direction to transport the print tape 22 and the ink ribbon 32 in a transport direction T by a separation feed amount Dbp, which corresponds to the distance Dbp between the print position (P position) and the separation position (B position). In other words, because ink of the ink ribbon 32 is melted and attached to the print tape 22 at the position lastly printed by the thermal head 12, the print tape 22 and the ink ribbon 32 are transported a separation feed amount Dbp to forcibly pull the ink ribbon 32 from the print tape 22 by the separation portion 35*a*. In this way, the print tape 22 and the ink ribbon 32 can be accurately separated from each other.

Next, so that the ribbon cassette 30 is replaced with one that has an ink ribbon 32 of the same color as the next printing color, a message prompting for the ribbon cassette 30 to be removed is displayed in the display 5 (S71). Then, the cassette cover 3 is opened, which moves the operation plate 74 in the rearward direction, and an "H" level cover open and close signal VS is output from the cover open and close detection switch 102 (S72: Yes). In addition, all six of the detection switch signals become "H" level signals, as the ribbon detection signal RS from the group of ribbon detection switches 103. When the ribbon cassette 30 has been removed (S73: Yes), a message prompting the user to rewind the print tape 22 and to insert an ink ribbon 32 of a ribbon cassette 30 having the same color as the next printing color is displayed on the display 5 (S80').

While the message is displayed, the user grasps the grip 23*a* of the tape spool 23 and rotates the tape spool 23 to rewind the print tape 22 until the mark M printed at the front portion of the print tape 22 becomes aligned with the tape discharge port 1007. In other words, the user rewinds the print tape by rotating the tape spool 23 until the mark M is positioned at the tape discharge port 1007. After rewinding operations are completed, the user mounts the ribbon cassette 30.

A portion of the following steps are similar to those performed in the print start position alignment process of the first embodiment. If all of the six switch signals making up the ribbon detection signal RS are not the "H" level, signifying that the ribbon cassette 30 is mounted (S81:Yes), then the ribbon color R of the mounted ribbon cassette 30 is read based on the ribbon detection signals RS (S82). Then, the next printing color C of the printing color sequence is read (S83). If the ribbon color R does not match the next printing color C (S84:No), then steps S80' through S84 are repeated.

When the ribbon color R matches the next printing color C (S84:Yes), the stored character array appended with the data for the next printing color C is read from the text memory 121. Further, dot pattern data for that character array is developed in the printing data buffer 125 (S85). When the cassette cover 3 is not closed (S86':No), a message prompting for the cassette cover 3 to be closed is displayed in the display 5 (S89). When the cassette cover 3 has been closed (S81':Yes), the control then returns to S21 of the multi-color printing control.

In summary, in the second embodiment, after the text is input, the process for setting the printing color sequence is executed to set the color number N and the color sequence of the printing colors. Then, a process to set the printing target range for each of the colors among a plurality of colors to be printed is executed. Afterward, a print start process is performed before start of actual printing. In the print start process, the mark M formed from a vertical line for positioning the print tape 22 is printed on the print tape 22. Then, the print tape 22 is fed in the feed direction T the sum of the print cutting interval distance Dcp added to the cut interval discharge distance Dsc so that the mark M of the print tape 22 will be positioned at the tape discharge port 1007. Printing is first started from this position. Each time a print process is executed for a set color, a print tape rewind process for rewinding the print tape 22 is executed.

To perform the tape rewind process, the user removes the ribbon cassette 30, grasps the grip 23*a* of the tape spool 23, and rotates the tape spool 23 to rewind the tape 22 until the mark M printed on the print tape 22 is aligned with the tape discharge port 1007. When the ribbon cassette 30 for the next color to be printed is mounted, printing of the text set with that color is started.

In this way, in the tape-shaped label printing device 1', before printing is first started, a mark M formed from a vertical line is printed on the print tape 22. Consecutively with this, tape feed is performed until the mark M is aligned with the discharge port. Afterward, printing is first executed. After printing is completed, the user rewinds the print tape 22 until the mark M is aligned with the tape discharge port 1007. In this way, the user can easily align the tape at the print starting position for each color. Printing can be performed a plurality of times in the same region without shift in the printing position and without providing a detection mechanism such as sensors. Also, a mechanism need not be provided for allowing reciprocal feed of the print tape 22.

As is clear from the above explanation, a tape-shaped label printing device according to the second embodiment is inexpensive, compact in size, and capable of printing a plurality of times in the same region without provision of a detection mechanism. Also, because the mark is printed before printing is started, the number of times printing is performed is reduced. Also, positioning of the mark printed on the tape can be easily performed.

While the invention has been described in detail with reference to specific embodiments thereof, it would be apparent to those skilled in the art that various changes and modifications may be made therein without departing from the spirit of the invention, the scope of which is defined by the attached claims.

For example, the separation member 35 could be provided as an independent member to the thermal printing mechanism 10 at the downstream side from the thermal head 12 in a tape-feed direction. Also, because the necessary separation feed amount Dbp varies with the ink ribbon used, the distance Dbp could be set depending on the ink ribbon. It should be noted that the present invention could be applied to a variety of tape-shaped label printing devices such as a printer type of tape-shaped label printing device for receiving print data of text from an external device, such as a computer, connected on line and performing multicolor printing by serially replacing a plurality of ribbon cassettes 30 with different colored ribbon.

Also, in the second embodiment, after printing the mark M, the print tape 22 is transported until the mark M is aligned with the tape discharge port 1007 and then printing is first performed. For the second and subsequent printings, the print tape 22 is rewound until the mark M is aligned with the tape discharge port 1007 and printing is performed from the position confronting the thermal head 12. However, after the mark M is printed, the print tape 22 can be transported a predetermined distance until the mark M is aligned in a position passed the tape discharge port 1007 and then printing can be first performed. During the second and subsequent printings, the print tape 22 can be rewound until the mark M is positioned at the tape discharge port 1007 and printing performed after the print tape is transported the predetermined distance from that position. In other words, the distance between the mark M and the print start position can be longer than the distance between the print position P of the thermal head 12 and the tape discharge port 1007.

Also, in the second embodiment, after the mark M is printed, the print tape 22 is transported until the mark M reaches the tape discharge port 1007. By setting the print start position to the position confronting the thermal head 12 at this point, the wasted portion of the print tape 22 can be reduced.

Figure 36:
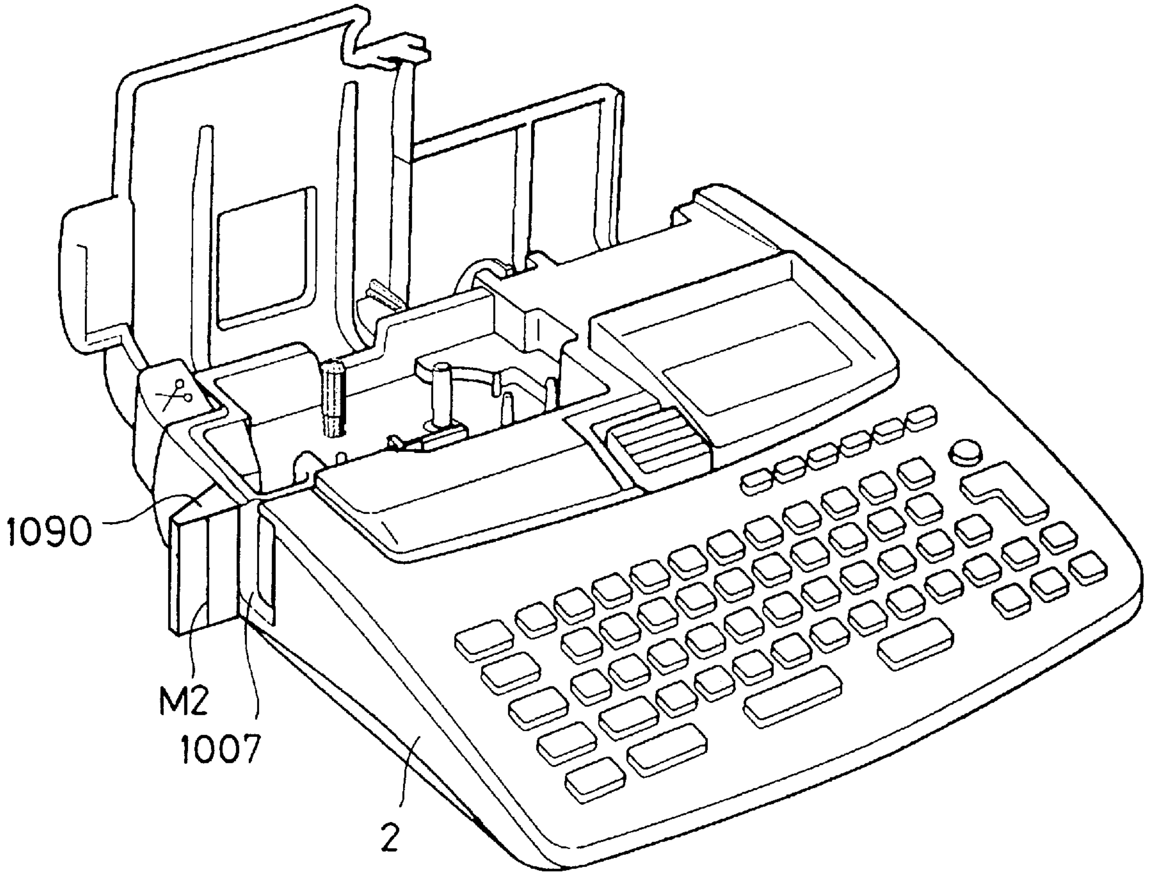
FIG. 36 is a perspective view showing a tape-shaped label printing device according to a modification of the second embodiment, and including a positioning mark formed to a positioning member.

Also, in the second embodiment, the second and subsequent printings are performed with the mark M aligned with the tape discharge port 1007. However, as shown in FIG. 36, an outwardly protruding positioning member 1090 can be provided to the rear side of the tape discharge port 1007 at the leftside surface of the main cover 2. A vertical positioning mark M2 is formed to the positioning member 1090. After the mark M is printed on the print tape 22, the print tape 22 is transported until the mark M is aligned with the positioning mark M2 of the positioning member 1090. Afterward, printing is first started. The second and subsequent printings are performed by rewinding the print tape 22 until the mark M is aligned with the positioning mark M2 and printing is started from this condition.

The positioning member 1090 can be configured to be folded into the main cover 2. With this configuration, when the positioning member 1090 is not needed, it can be contained in the main cover 2 so that the positioning member 1090 does not protrude from the main cover 2 and get in the way.

What is claimed is:

1. A tape-shaped label printing device for printing characters, such as alphabetic characters and symbols, on a tape, the tape-shaped label printing device comprising:

a housing formed with a tape-discharge port;

a tape movement mechanism for moving a tape from a tape source, along a tape movement pathway, and toward and out of the discharge port;

a print unit including a print head disposed along the tape movement pathway, the print unit, in order to print a character train in the region of the tape, printing with the print head a plurality of times across a same region of the tape moved by the tape movement mechanism; and a control unit that controls the print unit to print a tape-positioning mark on the tape before printing the character train in the region, the control unit controlling the print unit to start printing of the character train at a position on the tape separated from the tape-positioning mark by at least a distance between the print head and the discharge port with respect to the tape movement pathway.

2. A tape-shaped label printing device as claimed in claim 1, wherein the control unit controls the print unit to print the tape-positioning mark before printing once across the region of the tape to print the character train.

3. A tape-shaped label printing device as claimed in claim 1, further comprising a positioning unit provided near the discharge port and for positioning the tape-positioning mark printed on the tape.

4. A tape-shaped label printing device as claimed in claim 3, further comprising a manual rewind unit enabling a user to manually move the tape along the tape movement pathway toward the tape source between each of the plurality of times printing is performed across the region of the tape.

5. A tape-shaped label printing device as claimed in claim 1, further comprising a positioning unit provided near the discharge port and for positioning the tape-positioning mark printed on the tape; wherein the control unit controls the print unit to start printing at a position separated from the tape-positioning mark by at least a distance between the print unit and the positioning unit.

6. A tape-shaped label printing device as claimed in claim 5, wherein the positioning unit is formed with a mark having a same shape as the tape-positioning mark.

7. A tape-shaped label printing device as claimed in claim 2, wherein the tape-positioning mark is a line extending in a widthwise direction substantially perpendicular to movement of the tape by the tape movement mechanism.

8. A tape-shaped label printing device as claimed in claim 1, wherein the discharge port is defined by an edge extending in a direction substantially perpendicular to movement of the tape through the discharge port, the tape-positioning mark being a line extending across the tape in a widthwise direction substantially perpendicular to movement of the tape.

9. A tape-shaped label printing device as claimed in claim 1, further comprising a manual rewind unit enabling a user to manually move the tape along the tape movement pathway toward the tape source between each of the plurality of times printing is performed across the region of the tape.

10. A tape-shaped label printing device as claimed in claim 1, further comprising a ribbon-cassette mounting portion for freely detachably mounting one of a plurality of ribbon cassettes each housing a different color ink ribbon for printing serially on the tape in a plurality of print colors; wherein:

the tape movement mechanism moves, in synchronization with the tape, an ink ribbon of a mounted one of the ribbon cassettes; and the print unit prints on the tape with the print head via the ink ribbon.

11. A tape-shaped label printing device as claimed in claim 1, wherein, after the print unit prints the tape-positioning mark, the tape movement mechanism moves the tape along the tape movement pathway at least a distance between the print head and the discharge port with respect to the tape movement pathway.

12. A tape-shaped label printing device for printing characters, such as alphabetic characters and symbols, on a tape, the tape-shaped label printing device comprising:

a housing formed with a tape-discharge port;

a tape movement mechanism for moving a tape from a tape source, along a tape movement pathway, and toward and out of the discharge port;

a print unit including a print head disposed along the tape movement pathway, the print unit, in order to print a character train in the region of the tape, printing with the print head a plurality of times across a same region of the tape moved by the tape movement mechanism; and a control unit that controls the print unit to print a tape-positioning mark on the tape before printing the character train in the region.

13. A tape-shaped label printing device for printing characters, such as alphabetic characters and symbols, on a tape, the tape-shaped label printing device comprising:

a housing formed with a tape-discharge port;

a tape movement mechanism for moving a tape from a tape source, along a tape movement pathway, and toward and out of the discharge port;

a print unit including a print head disposed along the tape movement pathway, the print unit, in order to print a character train in the region of the tape, printing with the print head a plurality of times across a same region of the tape moved by the tape movement mechanism;

a control unit that controls the print unit to print a tape-positioning mark on the tape before printing the character train in the region; and a positioning configuration for visually confirming position of the tape-positioning mark printed on the tape, the positioning configuration being provided near the discharge port and exposed exterior of the housing.

14. A tape-shaped label printing device as claimed in claim 13, wherein the positioning configuration includes a positioning member protruding outwardly from the housing.

15. A tape-shaped label printing device as claimed in claim 13, wherein the positioning configuration includes a positioning member protruding outwardly from the housing; wherein the control unit controls the print unit to start printing at a position separated from the tape-positioning mark by at least a distance between the print unit and the positioning member.

16. A tape-shaped label printing device as claimed in claim 15, wherein the positioning member is formed with a mark having a same shape as the tape-positioning mark.

17. A tape-shaped label printing device as claimed in claim 13, wherein the positioning configuration includes an edge defining the discharge port and extending in a direction substantially perpendicular to movement of the tape through the discharge port, the tape-positioning mark being configured from a line extending across the tape in a widthwise direction substantially perpendicular to movement of the tape.

18. A tape-shaped label printing device for printing characters, such as alphabetic characters and symbols, on a tape, the tape-shaped label printing device comprising:

a housing formed with a tape-discharge port;

a tape movement mechanism for moving a tape from a tape source, along a tape movement pathway, and toward and out of the discharge port;

a print unit including a print head disposed along the tape movement pathway, the print unit, in order to print a character train in the region of the tape, printing with the print head a plurality of times across a same region of the tape moved by the tape movement mechanism; and a control unit that controls the print unit to use the print head to print a tape-positioning mark on the tape before using the print head to print the character train in the region.

* * * * *